(12) United States Patent
Kloor

(10) Patent No.: US 11,544,906 B2
(45) Date of Patent: Jan. 3, 2023

(54) MOBILITY SURROGATES

(71) Applicant: Beyond Imagination Inc., Burbank, CA (US)

(72) Inventor: Harry Kloor, Burbank, CA (US)

(73) Assignee: Beyond Imagination Inc., Burbank, CA (US)

( * ) Notice: Subject to any disclaimer, the term of this patent is extended or adjusted under 35 U.S.C. 154(b) by 240 days.

(21) Appl. No.: 16/892,801

(22) Filed: Jun. 4, 2020

(65) Prior Publication Data

US 2020/0388074 A1 Dec. 10, 2020

Related U.S. Application Data

(60) Provisional application No. 62/857,347, filed on Jun. 5, 2019.

(51) Int. Cl.
| | |
|---|---|
| *G06T 19/00* | (2011.01) |
| *H04L 9/14* | (2006.01) |
| *H04N 7/18* | (2006.01) |
| *G06N 20/00* | (2019.01) |
| *G06F 3/01* | (2006.01) |

(52) U.S. Cl.
CPC .......... *G06T 19/003* (2013.01); *G06F 3/011* (2013.01); *G06N 20/00* (2019.01); *G06T 19/006* (2013.01); *H04L 9/14* (2013.01); *H04N 7/185* (2013.01)

(58) Field of Classification Search
CPC .................................................... G06T 19/003
See application file for complete search history.

(56) References Cited

U.S. PATENT DOCUMENTS

| | | |
|---|---|---|
| 7,362,892 B2 | 4/2008 | Lewis et al. |
| 9,449,394 B2 | 9/2016 | Shoji |
| 2016/0059412 A1* | 3/2016 | Oleynik ................. B25J 9/0087 700/250 |
| 2017/0080565 A1* | 3/2017 | Dalibard .............. G05D 1/0214 |

OTHER PUBLICATIONS

International Search Report & Written Opinion, PCT/US20/36113, dated Oct. 15, 2020, p. 1-13.

* cited by examiner

*Primary Examiner* — Daniel T Tekle
(74) *Attorney, Agent, or Firm* — Fish & Richardson P.C.

(57) ABSTRACT

A mobility surrogate includes a humanoid form supporting at least one camera that captures image data from a first physical location in which the first mobility surrogate is disposed to produce an image signal and a mobility base. The mobility base includes a support mechanism, with the humanoid form affixed to the support on the mobility base and a transport module that includes mechanical drive mechanism and a transport control module including a processor and memory that are configured to receive control messages from a network and process the control messages to control the transport module according to the control messages received from the network.

14 Claims, 19 Drawing Sheets

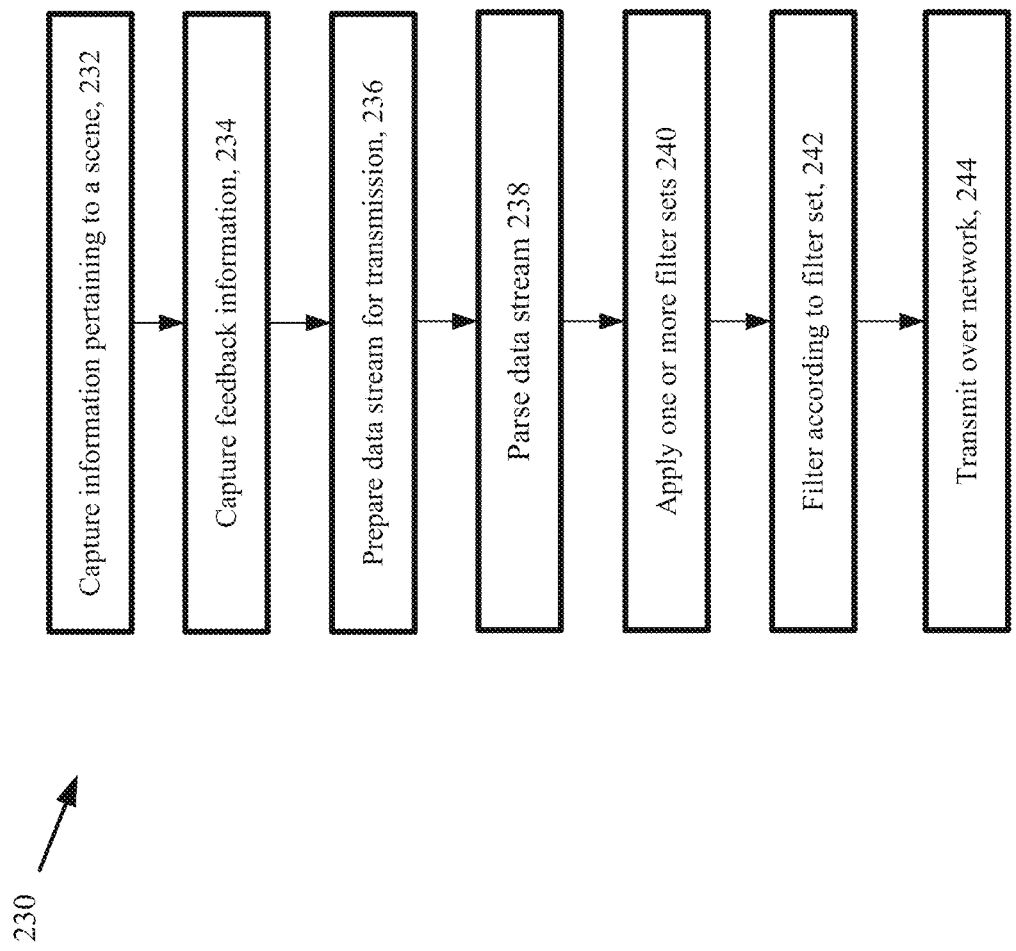

MOBILITY SURROGATES

CLAIM OF PRIORITY

This application claims priority under 35 USC § 119(e) to U.S. Provisional Patent Application Ser. No. 62/857,347, filed on Jun. 5, 2019, and entitled "MOBILITY SURROGATES," the entire contents of which are hereby incorporated by reference.

BACKGROUND

This disclosure relates to devices and systems for providing virtual surrogates for personal and group encounters through communication, observation, contact and mobility.

People can be separated by physical distances and yet can interact by conventional technologies such as telephones and teleconferencing. More recently, with the advent of networking and especially the Internet, people can hear each other's voices and see each other's images. Other developments have increased the perception of physical closeness.

For example, various types of virtual encounters are described in published patent application US 2005-0130108 A1 published Jun. 16, 2005. In the published application, a mannequin or a humanoid-type robot can be deployed as a surrogate for a human. In one type of encounter, a mannequin is paired with a set of goggles in a remote location. In another type, the surrogate is configured such that a human with sensors can produce actuation signals that are sent to actuators to a robot in a remote location, to remotely control movement of the robot via actuator signals sent to the actuators. Conversely, in another type of encounter, a humanoid robot can be configured with sensors for sending sensor signals to a body suit having actuators that receive the sensor signals, such that a user wearing the body suit feels what the humanoid robot senses.

Also disclosed in other types of encounters is the use of a camera supported by a surrogate sending video images that are overlaid with a virtual scene, which images are rendered by goggles worn by a user, or in the video images can be morphed into a different image that is rendered by the goggles.

As also disclosed in the published application is the use of a pair of surrogates and a pair of humans that are configured such that a first one of the pair of humans in a first location has its own surrogate in a remote second location and through the surrogate can experience stimuli that occurs at the second location, whether those stimuli are tactile, auditory, visual, etc., and vice versa.

One approach to bring mobility to virtual encounters is the use of the robot types as described in the above published application. In addition, there is an increasing need to remotely perform common tasks using robotics in a natural environment.

Remote video applications are increasingly needing to be more secure. The challenge to producing a highly secure and low-latency video connection has been difficult because of the nature of video data and the amount of encryption that is necessary to protect a video feed. Some existing data transmission protocols employ multiple pathways or multiple frequencies. However, these do not achieve the same goals because they do not specifically address the data security and latency considerations.

Remote real-time digital vision is well known. However, remote digital vision platforms have significant built-in latency, commonly known as lag. For instance, consider the average home security camera. It is not uncommon for someone to walk inside the house, look at the monitor, and still see themselves on the outside coming in. In addition, the transmission of high-definition video and related data is a costly process from the perspective of both processing and networking. The hardware required to capture and compress high definition video is expensive, and the bandwidth required to transmit such images is costly.

Current security protocols used in modern virtual private networking rely on high levels of encryption to protect the data in transit. These encryption methodologies used require the raw data being transmitted to be broken up into smaller encrypted packets, each of which is constructed and later reconstituted into the original form using resource-intensive and time-intensive algorithms. For security reasons, sometimes these algorithms are designed intentionally to require significant amounts of computation and/or time to implement.

Many modern networks also employ "quality of service" (QoS) techniques to prioritize the delivery of time-critical information. However, some additional application-specific features may be required in order to optimize specific types of content inherent in avatar communications.

SUMMARY

According to an aspect, a mobility surrogate includes a humanoid form supporting at least one camera that captures image data from a first physical location in which the first mobility surrogate is disposed to produce an image signal, and a mobility base. The mobility base includes a support mechanism, with the humanoid form affixed to the support on the mobility base and a transport module that includes mechanical drive mechanism and a transport control module including a processor and memory that are configured to receive control messages from a network and process the control messages to control the transport module according to the control messages received from the network.

Embodiments of the mobility surrogate can include any one or more of the following features or other features as disclosed herein.

The mobility surrogate includes an artificial intelligence system that includes a processor device, memory and storage that stores computer instructions to cause an artificial intelligence engine to train the mobility surrogate, with the artificial intelligence engine executing computer instructions to observe actions of a human performing a given task in the real world, analyze observed actions of the human to produce sequences of actions for the given task, and package the analyzed actions into a sequence package that is stored in computer storage. The artificial intelligence engine operates with a database. The artificial intelligence engine evolves to perform the tasks using the mobility surrogate. The actions are analyzed and used to train the artificial intelligence engine in the real world, rather than via a training program. The artificial intelligence engine is a mechanism that assists the human's control of the task.

The mobility surrogate includes instructions to train the artificial intelligence engine by observing the user's actions. Training includes instructions to define a self-organizing map space as a finite two-dimensional region of nodes, where the nodes are arranged in a grid and associate each node in the grid with a weight vector that is a position in the input space. The training further includes instructions to apply a training example to the self-organizing map, randomize the node weight factors in the map, select a training vector randomly from training data input, compute a given training vector's distance from each node in the map; and compare the node whose weight is closest to that of the training example as the best matching unit.

The artificial intelligence engine is configured to learn the task to reduce or eliminate latency or delay time or to increase efficiency or reliability of performing the task. The delays are bidirectional and can result from propagating of instructions through electronic equipment and communication, networks used to transmit the instructions and the processing time to execute instructions.

The artificial intelligence engine is built using a self-organizing map or self-organizing feature map, which are types of artificial neural networks trained by unsupervised learning techniques to produce a low-dimensional discretized representation of an input space of training samples. The mobility surrogate further includes a data center that is configured to accumulate and store skills sets for use with the artificial intelligence engine. The artificial intelligence engine downloads the skill sets from the data center. The mobility surrogate of further includes a platform that connects an operator to the mobility surrogate via a network and a sensor user interface link.

The mobility surrogate further includes an alias-substitution processing module including a processor configured to receive an image signal, detect a second mobility surrogate in the image signal, and replace the image data of the second surrogate in the first physical location with image data of a user in the first physical location to form a transformed image.

According to an additional aspect, a virtual reality encounter system includes a mobility surrogate in a first physical location, the mobility surrogate including a humanoid form supporting at least one camera that captures image data from a first physical location in which the first mobility surrogate is disposed to produce an image signal, and a mobility base with the humanoid form attached to the mobility base, and a user control device in a second, different physical location, the user control device configured to control the mobility surrogate.

Embodiments of the virtual reality encounter system can include any one or more of the following features or other features as disclosed herein.

The mobility surrogate is a first mobility surrogate, the user control device is a first user control device and the system further includes a second mobility surrogate that is in the second first physical location, the second the mobility surrogate includes a humanoid form, and a mobility base that comprise a support and a transport module, with the humanoid form attached to the mobility base, and a second user control device in the first physical location, the user control device configured to control the first mobility surrogate.

The virtual reality encounter system further includes an alias-substitution processing module including a processor configured to receive an image signal, detect the second mobility surrogate in the image signal, and replace the image data of the second surrogate in the first physical location, with image data of a user in the first physical location to form a transformed image.

The virtual reality encounter system further includes a user device including a display and transducer, the user device disposed in the second location, with the display configured to receive the transformed image. The virtual reality encounter system further includes a support mechanism to support the humanoid form to the mobility base, and a transport module including a mechanical drive mechanism and a transport control module including a processor and memory that are configured to receive control messages from a network and to process the control messages to control the transport module according to the control messages received from the network.

According to an additional aspect, a sensory user interface includes a processor and memory configured to operate and control a mobility surrogate unit, with the sensory user interface link further configured to control the mobility surrogate unit to stay aligned with activities of a human that is associated with the mobility surrogate unit so that motion of the mobility surrogate unit is synchronized with motion of the mobility surrogate.

Embodiments of the sensory user interface can include any one or more of the following features or other features as disclosed herein.

The sensory user interface further configured to synchronize the user to the mobility surrogate unit by providing to the user a set position of the mobility surrogate as a starting position that the user copies. The sensory user interface, when activated, causes a virtual reality headset worn by the user to see through the mobility surrogate's eyes. The sensory user interface, when activated, causes the mobility surrogate to be placed into a given position of a plurality of positions, to allow the user to copy that position. The sensory user interface, when activated, compensates for latency.

According to an additional aspect, a method of transmitting data from a transmitter to a receiver includes determining priority of data transmission of mixed data, according to types of data requested for transmission in order to assign a level of service to each of determined data type in the mixed data, discovering at least two different paths between the transmitter and the receiver, with the at least two different paths having at least one node that is different in the at least two different transmission paths, splitting the mixed data into plural segments, assigning each of the segments to one of the at least two different transmission paths with each segment being assigned a sequence number that provides to the segment an order of reconstitution of the segments into the data transmission stream at the receiver, encrypting each of the segments with one of plural different transmission keys, and transmitting the segments over the at least two different transmission paths, according to the assigned level of service.

Embodiments of the method of transmission can include any one or more of the following features or other features as disclosed herein.

The transmission keys and reception keys are private and public keys of asymmetric encryption. Transmission over multiple different paths allows for individual packets to be encrypted at lower encryption levels. Some of data is transferred over entirely different network paths. The set of keys may or may not be completely known at the time a transmission begins. The keys are symmetric keys.

One or more of the above aspects may include one or more of the following advantages.

The approach disclosed herein operates from the principal that the mobility surrogate units are alternative bodies for humans. The AI engine therefore is a mechanism that assists the human's control by acting like a sub-conscious. Training mechanism for the AI engine observes a user performing a task, and through such observation of the user's actions (and perhaps the user helping to document via verbal or other assistance help train the AI as to what it is doing) provides data on the observations. These data are recorded and uploaded to a central server. As the AI engine is trained, the AI engine can assist the user to perform the task and to reduce a user's latency, eventually becoming smart enough to augment a user's actions, and ultimately to perform actions autonomously.

Rather than transmitting video data as a sequence of large, compressed images, machine learning algorithms are used for transmission of the video data that will reduce transmission time by a significant amount beyond the level that can be achieved through standard means of data compression. The remote operator of the camera will see what appears to be a real-time high-definition processed image and the lag will be significantly less than with conventional approaches.

Described herein is a platform that allows for a secure connection using a distributed transmission process that increases security, reliability and transmission speed compared to conventional encryption and quality-of-service (QoS) approaches. The platform uses a mix of several existing technologies to produce a synchronized distributed virtual private network (VPN) that allows for quality of service measures to be applied within the VPN on a service-by-service basis.

DESCRIPTION OF THE DRAWINGS

FIG. 8A is flow chart useful for understanding the system of FIG. 8.

DESCRIPTION

Figure 1:
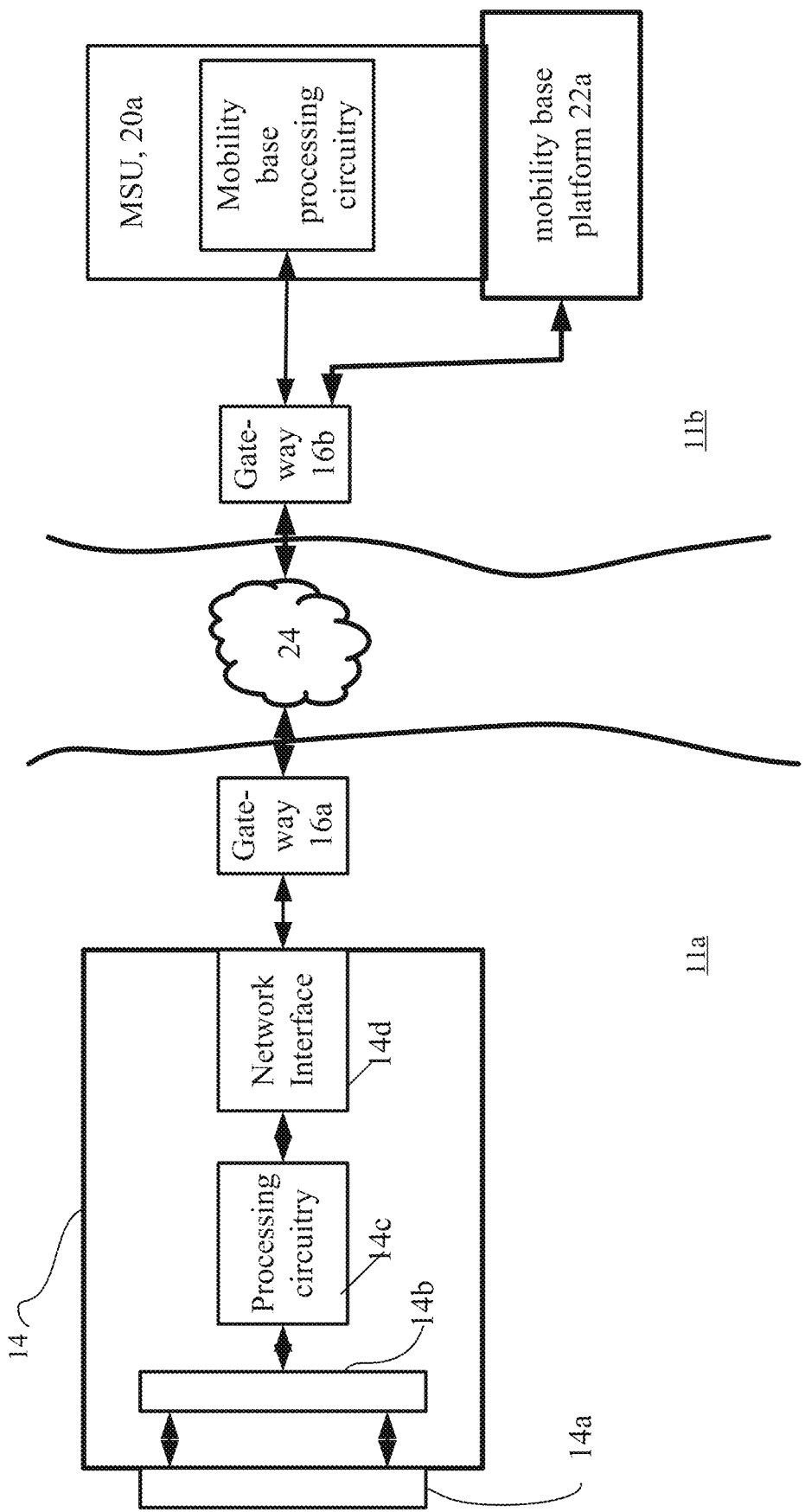
FIG. 1 is a functional block diagram showing processing components including a user interface control that is associated with a mobility surrogate.

Referring now to FIG. 1, a user interface control device 14 is shown (representative of user interfaces discussed below).

The user interface control device 14 includes a set of controls 14a, e.g., a joystick control or directional arrow controls (arrows that position N, S, E, W). The interface control device 14 also includes buffer circuitry 14b that buffers and converts if needed analog inputs from the set of controls into digital signals for processing by processing circuitry 14c. Processing circuitry 14c can convert the digital signals representative of user selections from the set of controls 14a into control signals that can be used to control directly a mobility surrogate unit 20a. One skilled in the art would appreciate that the nature of this conversion of digital signals would be predicated on the specific requirements and specifications of the mobility surrogate unit 20a, which specific requirements and specifications likely would vary according to the type of a mobility surrogate unit 20a used.

Thus, in FIG. 1, user interface control 14 is configured such that the processing circuitry 14c converts user input signals produced from the mechanical controls 14a and received from the buffer circuitry 14b into signals that can be used to directly control the mobility surrogate unit (MSU) 20 and associated surrogate platform portion 22. These signals are coded into the command messages and can be packaged into network packets for transmission across a network 24 to the mobility base 22a. (See secure robotics application private network adapter discussion below.) In other embodiments, the messages can be encoded into, e.g., packets that are transmitted via a short distance wireless technology, e.g., Bluetooth, to a paired surrogate platform.

Processing circuitry 14c can include packet processing functionality that packages the command messages into packets that include a network address (including, but not limited to, an Internet Protocol Address, or IP Address) of the corresponding gateway (or router if applicable) together with a private network address of the mobility base 22 associated with the mobility surrogate unit 20 (or into packets having appropriate pairing information for the paired mobility surrogate unit 20).

Any of several techniques can be used to communicate the command messages from the user interface control device 14 to the mobility base 22 over the network 24. One such approach is the so called "Internet Of Things." The remote control 14 can be connected to the Internet of Things using either static or dynamically assigned network addresses provided by an internet service provider (ISP). On the other hand, if a totally private network were used other approaches could be used.

Connections to an ISP by an assigned network address may change each time there is a reconnect to the ISP. The so called "Dynamic Host Configuration Protocol" (DHCP) a network protocol that functions at the application layer of the Internet Protocol (IP) suite can dynamically assign network Addresses to devices on the network. The exact networking details would be within the level of skill in the networking art, and therefore need not be covered extensively here. Suffice it to say that the user interface controls and the mobility platforms communicate via communication gateways 16a-16b (or routers) and the network 24. The communication gateway 16a-16b also communicates other information between locations 11a and 11b, from the mobility surrogate unit 20a, as will now be discussed.

Figure 2:
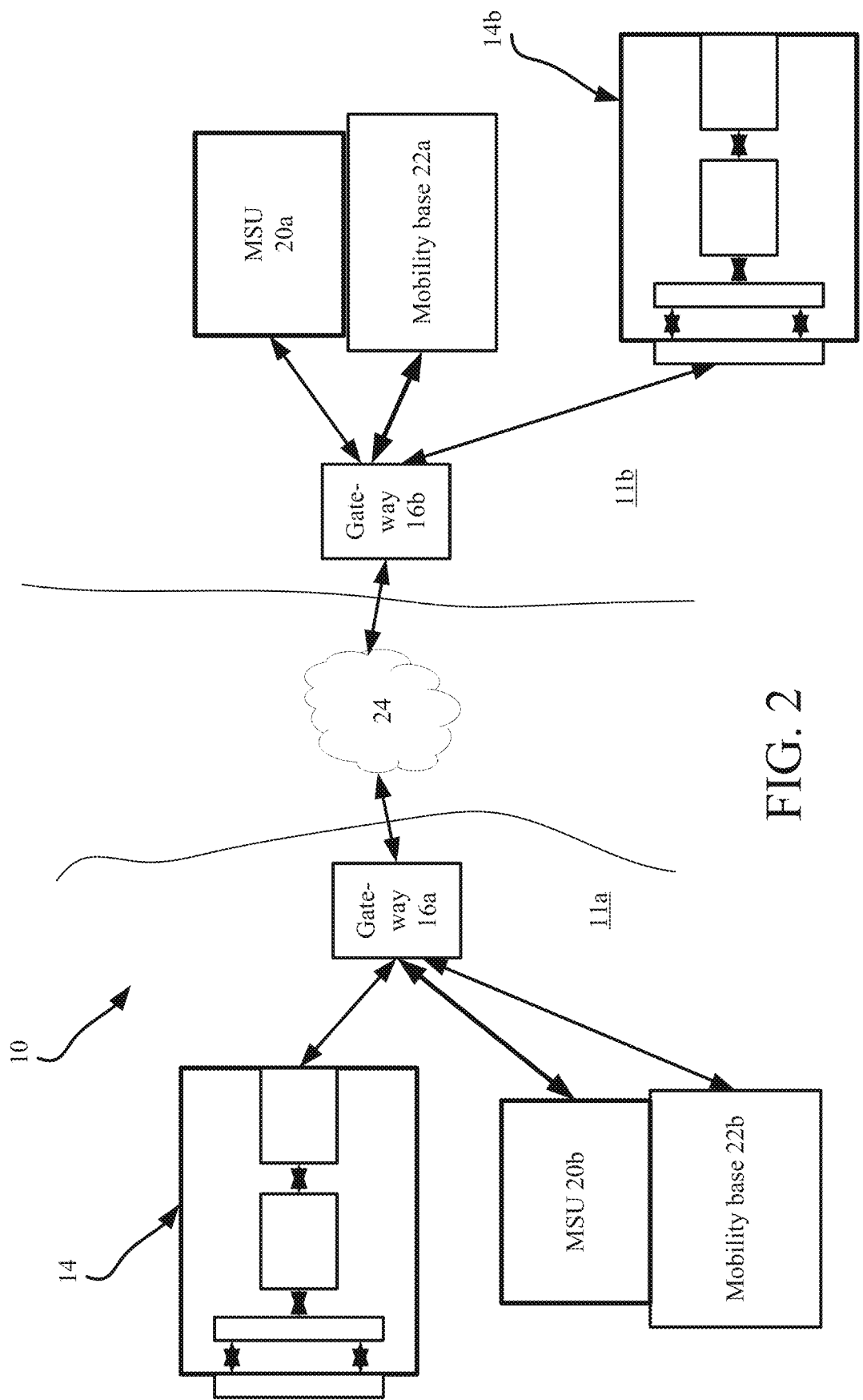
FIG. 2 is a functional block diagram of operational control of a mobility base for the mobility surrogate.

Referring to FIG. 2, operation of system 10 will now be described. A user interface control device 14a is configured to communicate with the MSU 20a, via the gateways 16a, 16b and the network 24, whereas a user interface control device 14b is also configured to communicate with the via the gateways 16a, 16b and the network 24. The interface control device 14a controls movement of the mobility base 22a and hence the mobility surrogate unit 20a of which the mobility base 22a is a part of. The interface control device 14b controls movement of the mobility base 22b and hence a mobility surrogate unit 20b of which a mobility base 22b is a part of The gateways 16a, 16b also communicate other information between the surrogate electronics (in the mobility surrogate units 20a, 20b) and electronic devices carried by users (such as goggles, body suits, tactile actuators, etc. not shown), over the network 24 via the gateways 16a, 16b.

Discussed herein users and mobility surrogate units (MSU) can be remote from each other (remote physical locations communicating via a network) or can be in the same general locations (communicating via short distance communication for direct communications or via a network when communicating with a remote server computer).

As used herein, a mobility surrogate unit (MSU) is defined as an alternative body for a human operator. The MSU possesses mobility, through a mobility platform, and intelligence through an AI engine. The MSU typically has a human-like torso. Aspects that help define the MSU further include operation in conjunction with a mobility surrogate unit sensory system (or platform) and the AI engine that is trained by observation of a human (or another MSU) performing a task. Other features of the MSU are discussed below.

Figure 3:
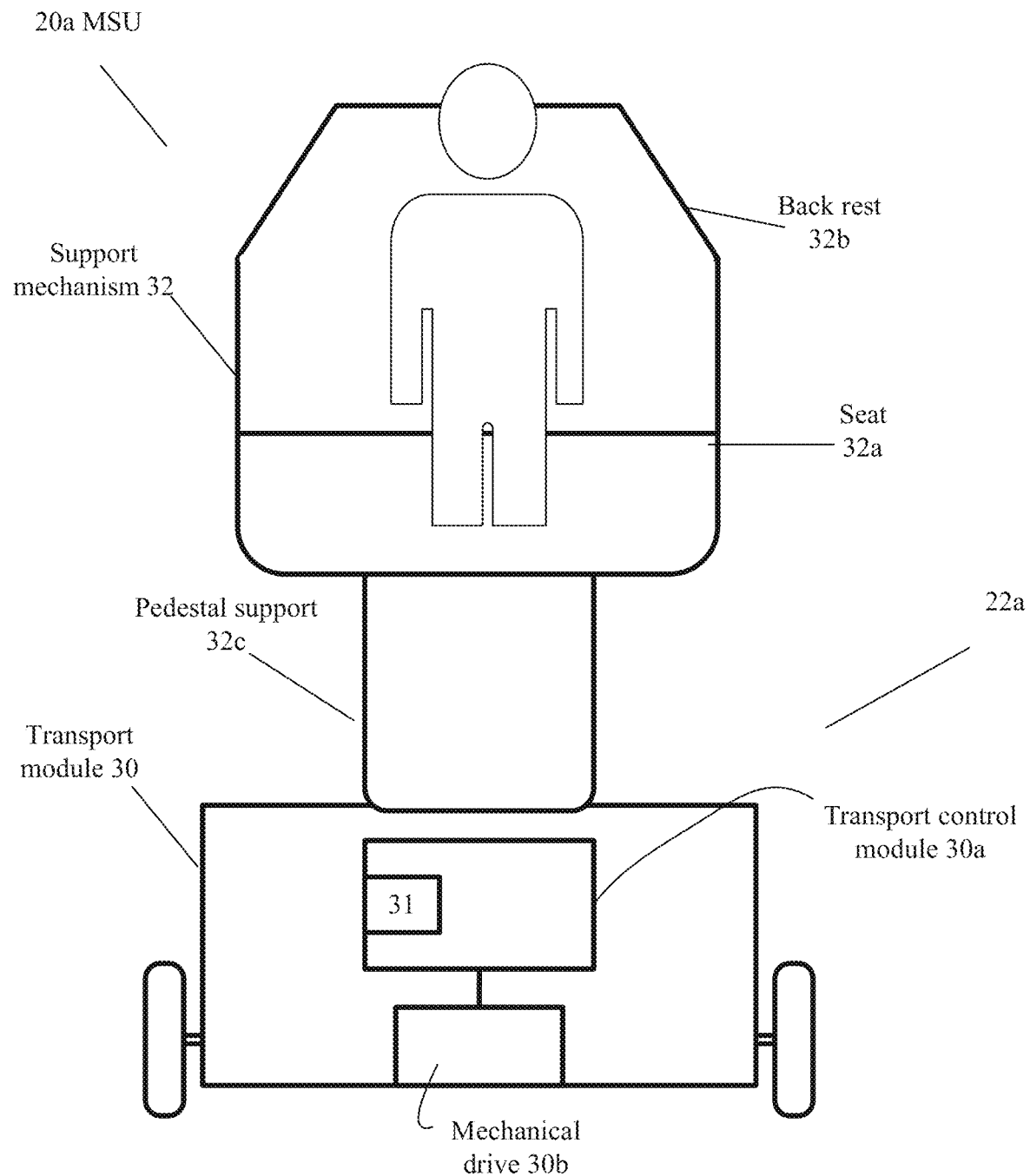
FIG. 3 is a diagrammatical view of an example of a mobility base for the mobility surrogate.

Referring to FIG. 3, an example of the mobility surrogate unit 20a (MSU 20a) is shown to include the mobility base 20a that includes a transport module 30 that houses a transport control module 30a and mechanical drive mechanism 30b. The transport control module 30 is coupled to a support mechanism 32 that supports a humanoid form or humanoid form torso 34 that is affixed to or otherwise secured to the support mechanism 32. For example, the support mechanism 32 can include a seat portion 32a, a backrest portion 32b and a pedestal portion 32c. The pedestal portion 32c supports the seat portion 32b and the support portion can be supported on the transport module 30. The transport control module 30a and drive mechanism 30b may also incorporate various sensors 31 that provide them with information about their environment and their orientation within it, also interconnected as needed with other components. For example, one such sensor is a gyroscope to help the MSU to maintain balance.

The mechanical drive mechanism 30a is generally of a conventional type according to the type of mobility platform used, as discussed above. The transport control module 30b is shown as within the transport module 30, but the transport control module 30a can be located anywhere on the mobility base or in the MSU 20a.

Various configurations can be provided for mounting of a humanoid form on a mobility base seat 32a to provide the MSU 20a. For example, the humanoid form could be a standing humanoid form (as in FIG. 6A or a seated humanoid form FIG. 6B or a standing humanoid form that is integrated into the mobility base FIG. 6C).

Figure 4:
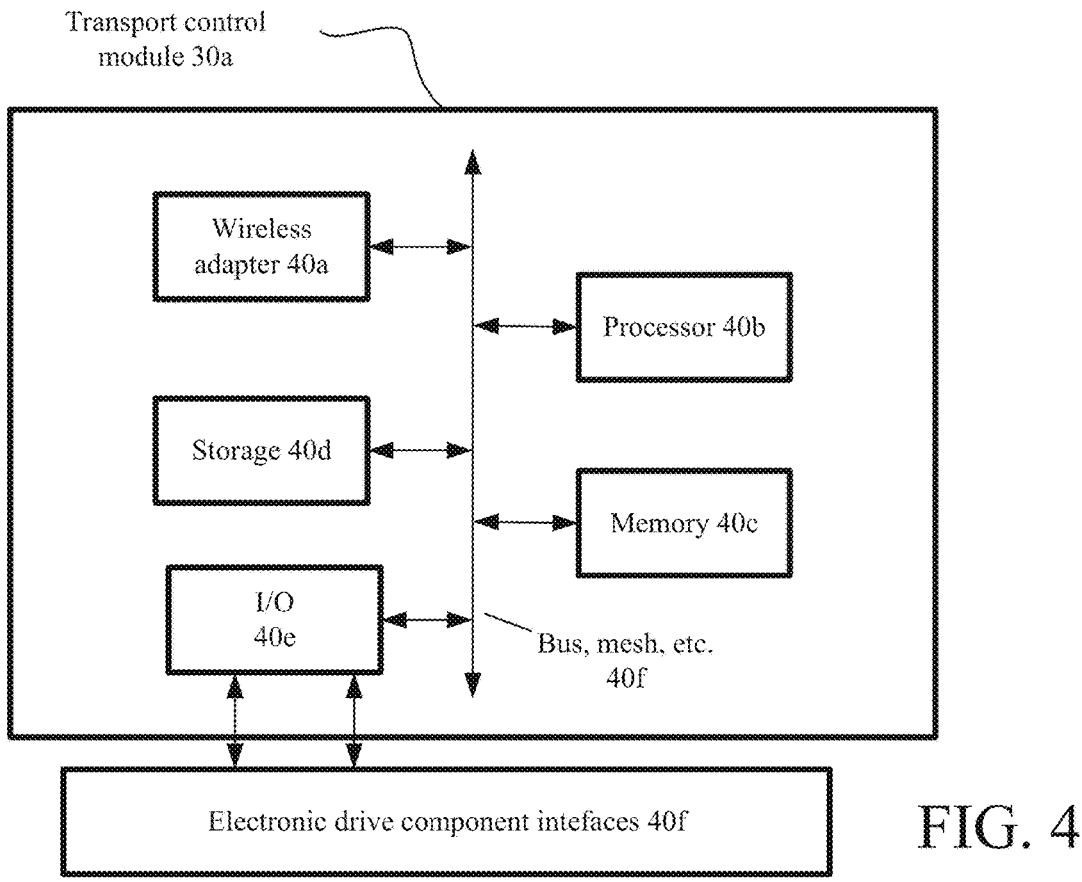
FIG. 4 is a functional block diagram showing processing components of the transport control module of the mobility base.
Figure 5:
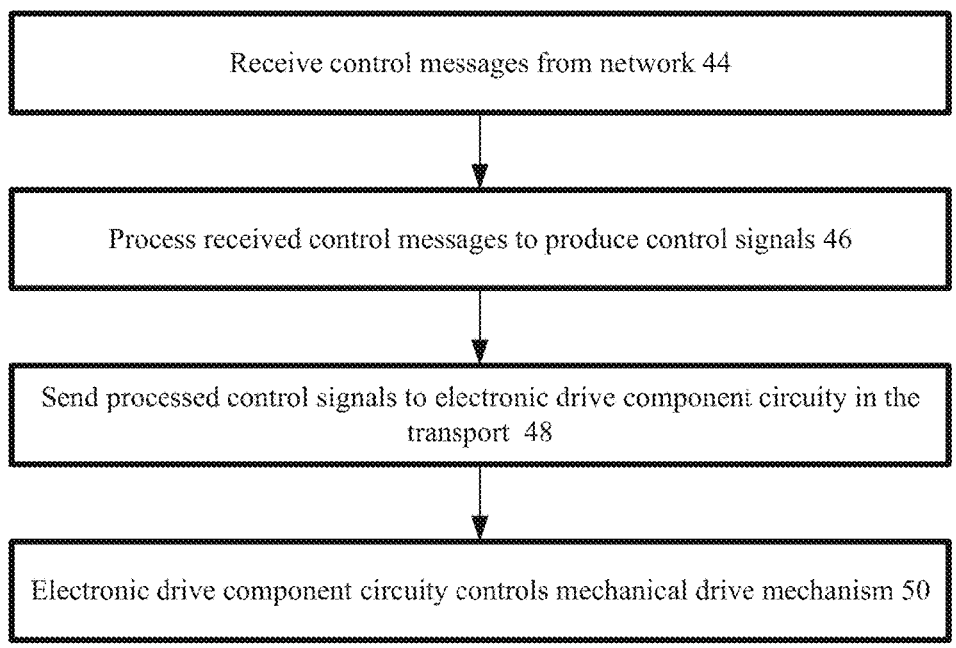
FIG. 5 is a flow chart depicting transport control processing.

Referring now to FIG. 4, the transport control module 30a functions to receive command messages from the network 24 (see FIG. 2), and process the command messages, as needed, to produce controls signals that control specific operations of the mechanical drive mechanism 30b (see FIG. 3). The transport control module 30a includes a wireless network interface card (WNIC) 40a that is configured to establish a connection with a gateway (or router), such as the gateway 16b (FIG. 2), a processor 40b, memory 40c, storage 40d and input/output interfaces 40e, all of which are interconnected as appropriate by a bus or mesh or other interconnection scheme 40f. The mechanical drive mechanism 30b also includes electronic drive components, such as motors, gimbals, transmission control, etc., as needed for the particular type of mobility platform that is used (as mentioned above). These electronic drive components interface to the mechanical drive mechanism 30b, in an otherwise conventional manner. Referring now to FIG. 5, the transport control module 30a functional operations 44 through 50 are shown. The transport control module 30a receives 44 control messages from the network 24, which command messages are originated by the user interface device, such as user interface device 14a. The transport control module 30a processes 46 the received command messages and generally interprets the received command messages and local sensor information to produce control signals at the I/O output interface circuits 40f, which signals are communicated 48 to the electronic drive component circuitry 40g in the transport module 30. These signals control 50 the mechanical drive assembly 30b (FIG. 3) according to the command messages received from the network. The base operates via remote control and by merging remote commands with actual local sensor data, such as where walls are located, to generate final actions.

Figures 6A, 6B, 6C:
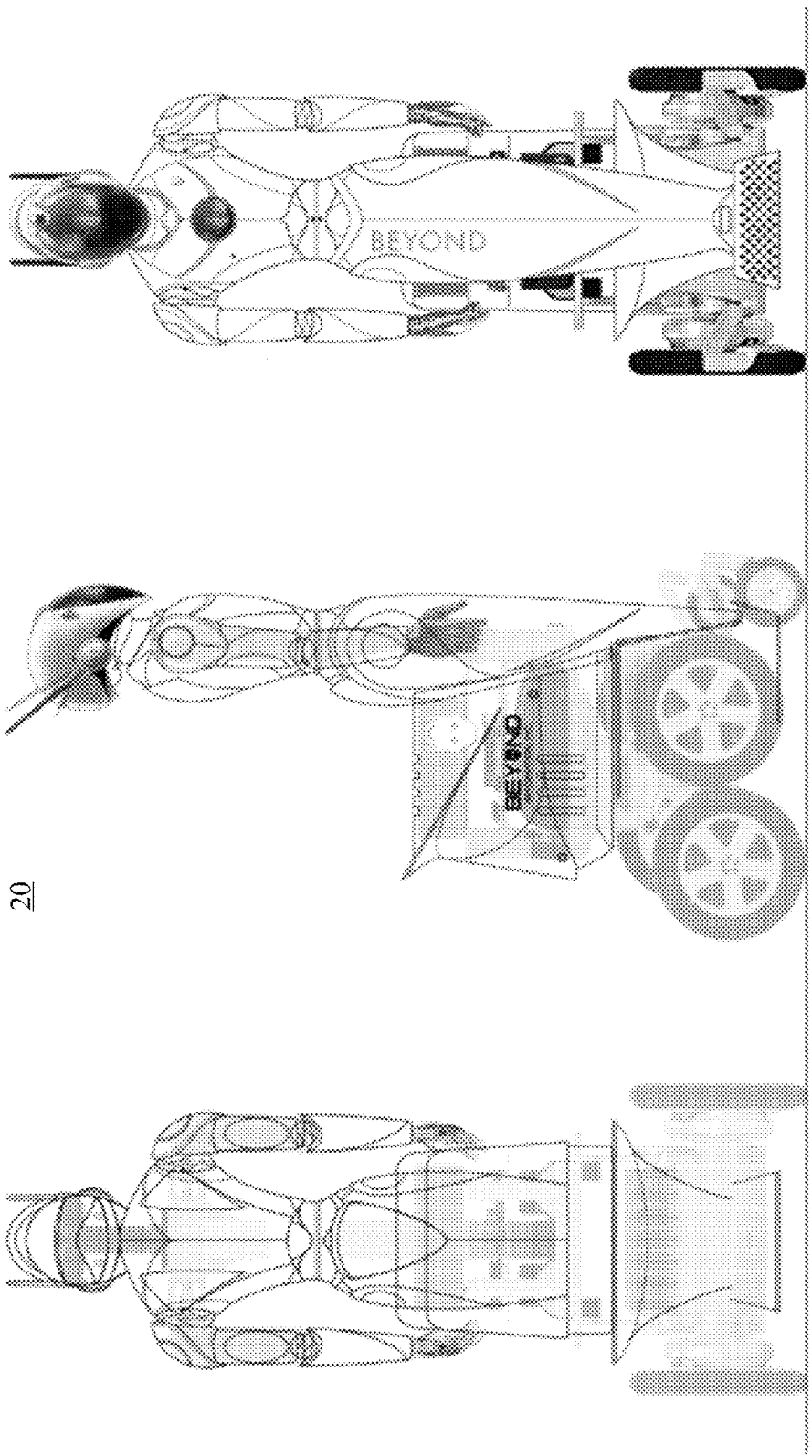
FIGS. 6A-6C depict an example of a mobility surrogate with mobility base.

Referring now to FIGS. 6A-6C an example of the mobility surrogate 20 is shown. FIGS. 6A and 6B depict rear and side views, whereas FIG. 6C depicts a front view.

In FIGS. 6A-6C, the mobility surrogate includes a torso portion and a mobility base that requires a human to operate the mobility base to complete certain functions. The torso portion of the mobility surrogate in FIG. 6A is shown integrated with the mobility base.

A mobility base 22a can be adaptions of powered wheelchairs, and more generally, the mobility surrogate can be an adaptation of any similar mobility base. Requirements of the mobility base 22a can include characteristics such as dynamic balancing, so that the base can remain vertical, e.g., stand on two wheels and compensate for the motion of a human torso that is sitting on top of it. If a human leans forward it can roll forward; if the human leans back, the mobility base 22a can roll back to the original position. If pushed it will not move—applying a counter force so the human torso stays upright. Requirements of the mobility base 22a can also include the ability to climb stairs. The mobility base 22a has a power source so that mobility base can carry a heavy weight around for a long period of time and the mobility base can navigate a range of environments.

The power source that powers the mobility base 22a can be used to at least partially power the humanoid form (in some embodiments). The system communicates via a mobility surrogate processor that is part of the humanoid form, etc. to the mobility base processing circuitry (FIG. 1) or so that control signals can be sent to control the motion of the mobility base. The form of the humanoid form mobility surrogate enables the full function of the mobility base—such that it can climb stairs by working in conjunction with the mobility base. The mobility base 22a is not an autonomous mobility surrogate—but instead is a humanoid form—meaning that the MSU 20 is controlled remotely by a human over a network using combination of visual, audio, and motion capture systems—so that the human is acting through the MSU 20 (FIG. 1).

There are various ways that the mobility base and humanoid form can be interfaced. The humanoid form could be bolted to the base, actually seated on the mobility base (if it had legs), or connected via a movable joint that would enable the humanoid form to rotate or bend from the connection point.

Various aspects cover communication from human to the mobility base 22a or MSU 20a.

The humanoid form may be connected to the power supply of the mobility base, drawing all its power from it. Alternatively, it might draw some of its power from the base and additional power from other power sources inside the mobility surrogate or carried atop the mobility base or external and wireless in nature. It might also draw no power.

Communication can be performed via a CAN (Controller Area Network) to the mobility base to control its motion. An interface as discussed above can be used to control the motion of the mobility base. Control will primarily come via human initiated control via a network or Bluetooth or other near field communication capabilities.

Control of the mobility base 22a and/or MSU 20a may come from the processor in the humanoid form or as detailed in below. Those signals for control will have come primarily from a human operator who is communicating through a wireless network to a receiver in the mobility surrogate and then passed through to the mobility base 22a. Alternatively, the receiver may be connected directly to the mobility base without passing through any of the processors in the MSU 20a.

In addition, at times the processor—via artificial intelligence or other program—may take control if the human instructions will cause the MSU 20a to take an action that will harm it or others. The mobility base 22a may have collision avoidance system that can override the human remote instructions. However, most of the time the human is in control, but there can be times where those instructions are over-ruled or modified.

Other data that is communicated may affect the operation of the mobility base 22a or MSU 20a. For instance, conventional use of the mobility base is to transport a humanoid form. Thus conventionally, the mobility base 22a is built to take into the account the humanoid's motions. In the present case, the mobility surrogate includes the mobility base 22a with suitable control and communication technologies, as well as the humanoid form that has its own suitable control and communication technologies such that the combination of the mobility base and the humanoid form simulates a human riding the mobility base 22a, and that combination approximates a human.

The use of humanoid form in the mobility surrogate uses elements of the humanoid form that are remotely controlled to control the mobility base 22a and thus the action of the MSU 20a. This can be further enhanced such as communicating the motion of the MSU 20a various parts—even before the mobile surrogate moves—so that the mobility base 22a can move in correspondence, if needed, to maintain balance or its intended motion path. If the humanoid form is going to lean in such a way that it could for instance tip the mobility base over, the mobility base senses that and overrides that movement or compensates for that movement, e.g., by slowing speed of movement or setting down its wheels.

The data that is communicated in addition to motion data also can include various sensor data, power management data, and other data. These data are tracked to optimize the operation of the humanoid form and the mobility base communicate individually and for better operation of the mobility surrogate.

Haptic data from the motion of the mobility base may also be sent back to the human, for a better experience and control. For instance, vibration data may be sent back so that the user feels the motion of the mobility base 22a. Dynamic feedback between the surrogate and mobility base 22a could also be transmitted back to the human—so that for instance if the human was seated in a chair that received data signals for tilt and vibration—the human could counter balance in the chair to prevent the mobility surrogate from falling over (alternatively, this may be automatically done by the onboard system in the mobility base—so that the configuration of the mobility base is adjusted).

A unique difference between the mobility surrogate and a simple autonomous vehicle emerges in that given that the mobility base was built for human, a human like mobility surrogate controlled either automatically or remotely with the assistance of a human operator could shift to prevent the mobility surrogate from falling over. Providing assistance of a human operator by shifting weight or body position provides a control mechanism that can use the legs, arms, waist etc. of the humanoid form such that the human form dynamically acts like a human being.

Below are some alternative embodiments:

The eco-system that of a human and a software platform through which the human connects to the MSU 20a is via a wireless link (Wi Fi, Bluetooth, cellular, etc.)—such that for smallest latency possible the control is not routed through a process and then to the mobile base but instead is directly sent to the mobile base. In other words, the human directly, and yet remotely, controls the mobile base and the surrogate.

Alternatively, the signal is routed through one or more processors before going to the MSU 20a. In some embodiments, a collision avoidance system is installed so that the system can override instructions from the human operator if they will cause a collision or other harmful action. Another alternative embodiment includes an autonomous mode where the human sends instructions for the mobility base 22a to move to specific destination or by a specific path. The user can otherwise operate the surrogate while the mobility base moves along the designated path or to the designated location.

Another aspect involves the human seeing via a virtual reality helmet, through the surrogate's eyes, and seeing an augmented overlay that shows the best path to a destination or object, and the human controls the mobility base—following that projected path. This might come from for instance a third party sending instructions to the human via the platform that connects the human to the mobility surrogate unit. For instance, the human operator might be a worker who via the platform connects with a surrogate to perform a task—they might not know what the task is—but when they arrive an AR overlay process communicates the task. The system uses the AR overlay to permit the user to guide the mobile base. Alternatively, the AR overlay may just allow a user select to approve or adjust a path, approve and thus permit the mobility base and the mobility surrogate to take over control of the mobility surrogate.

In other embodiments, the surrogate has legs and interfaces to the mobility base via wireless connections. Still other embodiments involve the legged version where it connects magnetically or through some other physical connection that can be released so that the surrogate can move off of the mobility base. Other leg versions are connected via a tether that provides some power or data communication or both so that it can communicate and or get power when sitting atop the mobility base as well as when stepping off of the mobility base. It is also possible in other versions of this configuration to disconnect from the tether and move about, and then reconnect to get power from the mobility base.

Another embodiment is where power is wirelessly transmitted to the surrogate when the humanoid form becomes disconnected physically from the mobility base. This power may be from the mobility base 22a or from additional batteries connected to the mobility base 22a. The mobility base can include "climb stairs assist" so that the human need not control the humanoid form—as that control is programmed in the mobility base, so that once the mobility base starts climbing stairs the mobility base takes control of the motion of the humanoid form to safely climb the stairs.

A further embodiment might involve having additional components incorporated into the humanoid form that extend or enhance the normal human functionality of a remote operator. By way of example but not limitation, such additional components could include omnidirectional vision systems, more than two limbs, or even multiple torsos.

Self-Organizing AI Engine

This aspect involves "production" of an "artificial intelligence subconscious"—via training of an artificial intelligence (AI) network that uses machine learning, and which is built into a humanoid form processor through AI techniques that are predicated on observing actions of a human and the human's surrogate in the real world. By artificial intelligence subconscious (AI subconscious) is meant that the entity is not being used to train the AI, but the AI becomes trained by observing the activities of hosts of surrogates and users.

Figure 7:
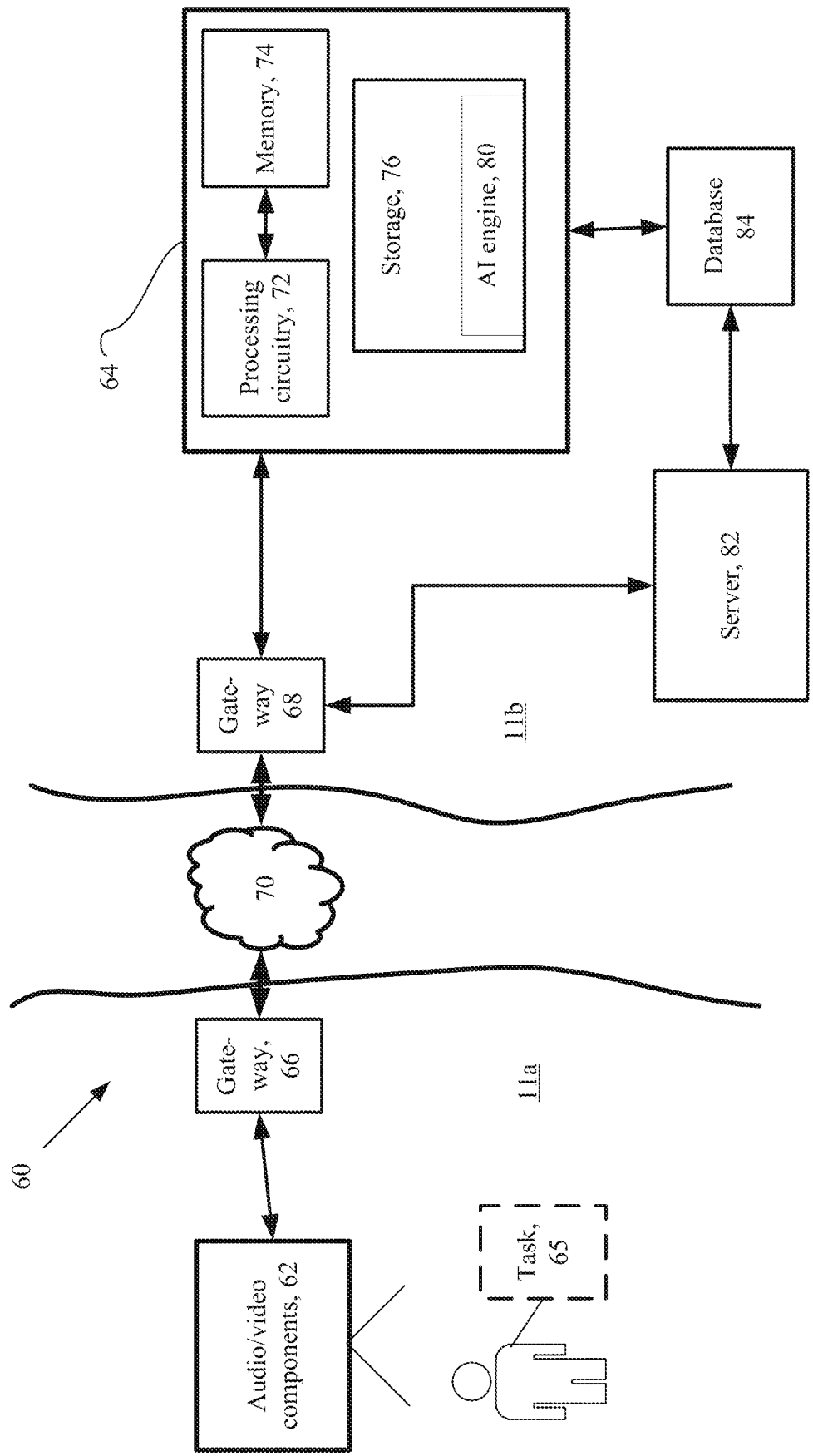
FIG. 7 is a block diagram of a training system.

Referring now to FIG. 7, a training system 60 is shown. The system 60 includes audio/visual components 62 and a machine learning system 64. The audio/video components 62 include, e.g., a microphone and camera that are focused on a user performing a task 65. The system 60 also includes a pair of gateways 66, 68 that span a network 70. The machine learning system 64 includes processing circuitry 72, memory 74 and storage 76 that stores an AI subconscious engine 80. The AI subconscious engine 80 is a self-organizing AI engine that uses machine learning algorithms. The AI subconscious engine 80 (AI engine 80) references a database 84 that stores information observed by the AI engine 80. The AI engine 80 and the database 84 will evolve to enhance both surrogate and human capabilities. The AI engine 80 will evolve to do human tasks by observing humans in the real world perform a given task. The AI engine 80 receives information that is based on the actions the human performs that will be used for training that mobility surrogate unit to perform such task better, e.g., with lower latency and higher accuracy.

Traditionally, AI, when applied to a mobility surrogate for instance, is viewed as the core product, as the mobility surrogate's form is to be controlled by this AI product to produce an autonomous AI engine. Conventionally, this approach when applied to mobility surrogate unit-like technology trains the AI via mobility surrogate unit exoskeletons, so that the AI will be able to independently control the mobility surrogate's form. The approach disclosed herein for the mobility surrogate is different from these traditional approaches.

The approach disclosed herein operates from the principle that the mobility surrogate units are alternative bodies for humans. The AI engine 80 therefore is a mechanism that assists the human's control by acting like a sub-conscious.

Initially, the training mechanism for the AI engine observes a user performing a task 65, and through such observation of the user's actions (and perhaps the user helping to document via verbal or other assistance help train the AI as to what it is doing) provides data on the observations. These data are recorded and uploaded to a central server 82. Server 82 analyzes these data and uses the results of the analysis to train the AI engine 80. Eventually, as the AI engine 80 is trained, the AI engine 80 can start to assist the user to perform the task 65 and to reduce a user's latency. As the AI engine 80 learns from the user's interactions, the AI engine 80 becomes smart enough to augment a user's actions, and ultimately to perform actions autonomously.

The described approach trains the AI engine 80 via analyzing actions of user in the real world, rather than via a training program. One purpose of the AI engine is to reduce or eliminate latency or delay time. Delay time is an amount of time between invoking execution of an instruction to the time that execution of the instruction occurs. These delays are bidirectional and can result from propagating of instructions through electronic equipment and communication, networks used to transmit the instructions and the processing time to execute instructions, e.g., the time delay it takes for a user's actions to be captured by a sensory unit interface (SUIL), transmitted to the MSU 20a, and executed by the mobility surrogate, as well as time delay for sensory data captured by the MSU 20a to be transmitted from the MSU 20a and back to the sensory user interface link carried by the human user.

There are a range of approaches that can be deployed so that the user will not notice some of the delay (such as preprocessing), and a range of techniques (such as projecting paths and augmented overlaid objects) to enable better user experience even if there are delays. The communication delays will be greatly reduced by building in 5G networking or other comparably high-speed networking capabilities into the MSU 20a.

The AI engine 80 extrapolates from a user's actions and predicts likely subsequent actions that can be used to minimize these delays. The AI engine learns how the user completes an action, and as learned, the AI engine 80 can execute instructions to cause the mobility surrogate to complete the learn action. The AI engine 80 is configured to learn and build AI engine 80 will grow in its ability to anticipate human physical behavior by observing multiple users performing the task.

The AI engine 80 may also be trained to increase the accuracy, repeatability and speed of its operations through the techniques described above. In a manner similar to the reduction of latency, these improvements in the quality of the mobility surrogate's actions will also serve to assist the user in completing actions, especially more complex actions, in a timely manner.

The AI engine 80 is built using principles of a self-organizing map (SOM) or self-organizing feature map (SOFM). These maps are each a type of artificial neural network trained by unsupervised learning techniques to produce a low-dimensional discretized representation of an input space of training samples (e.g., user movements).

Self-organizing maps differ from other artificial neural networks because these maps use competitive learning (nodes compete in order to respond to input data) rather than error-correction learning approaches, and use a neighborhood approach to preserve and learn topological properties of the input space.

The AI engine 80 will be able to manage and process the individual actions, given that most of the actions most humans take and how humans take those actions are relatively limited in number. Individuals quickly develop habits and fall into easily recognizable patterns. There may be unique aspects for each person's way of moving, but a movement library for each person is far less than their total number of possible movements. For instance, how an individual walks across a room, reaches for a water glass, opens a door, catches a ball, etc.—varies little from day to day or even year to year.

In addition, human physical actions have "tells," meaning that a given action is preceded by a specific action that previously preceded the given action. For example, a human in general will look at an object before reaching for the object. A person's next footstep can be predicted with a high degree of accuracy by the person's prior motion(s). Humans compensate to keep balance, e.g., by moving one part of their bodies to counterbalance another part of their body's motions. Just as AI can be programmed to pattern recognize and self-learn, self-organize words and the meaning of those words, the AI engine 80 will do the same for human movements.

Initially, the AI engine 80 will be used to anticipate and assist each user so that the experience for the user plugged into a sensory unit interface link (discussed below) as well as that of those who they are interacting with via a corresponding MSU exhibits minimal lag time. As time passes, the AI engine 80 will build a vast library of physical actions and skills stored in the database 84. A matured (e.g., substantively trained) AI engine 80 can be used to enhance actions performed by a human using an MSU. A transfer of skills via the AI engine 80 and augmented reality vision will subsequently assist humans to better perform such skills.

With a matured AI engine 80, many human-performed tasks will be easier because users will be able draw upon the sum total of expertise of all previous users of the MSU or multiple MSU's. The AI engine 80 can assist users in actions via various techniques, including but not limited to guided augmented vision, haptic feedback and guidance, and precision controls that guide a user's intent/actions and aid in user productivity, precision of motion, strength of motion, and any combination of these assisted actions.

Figure 7A:
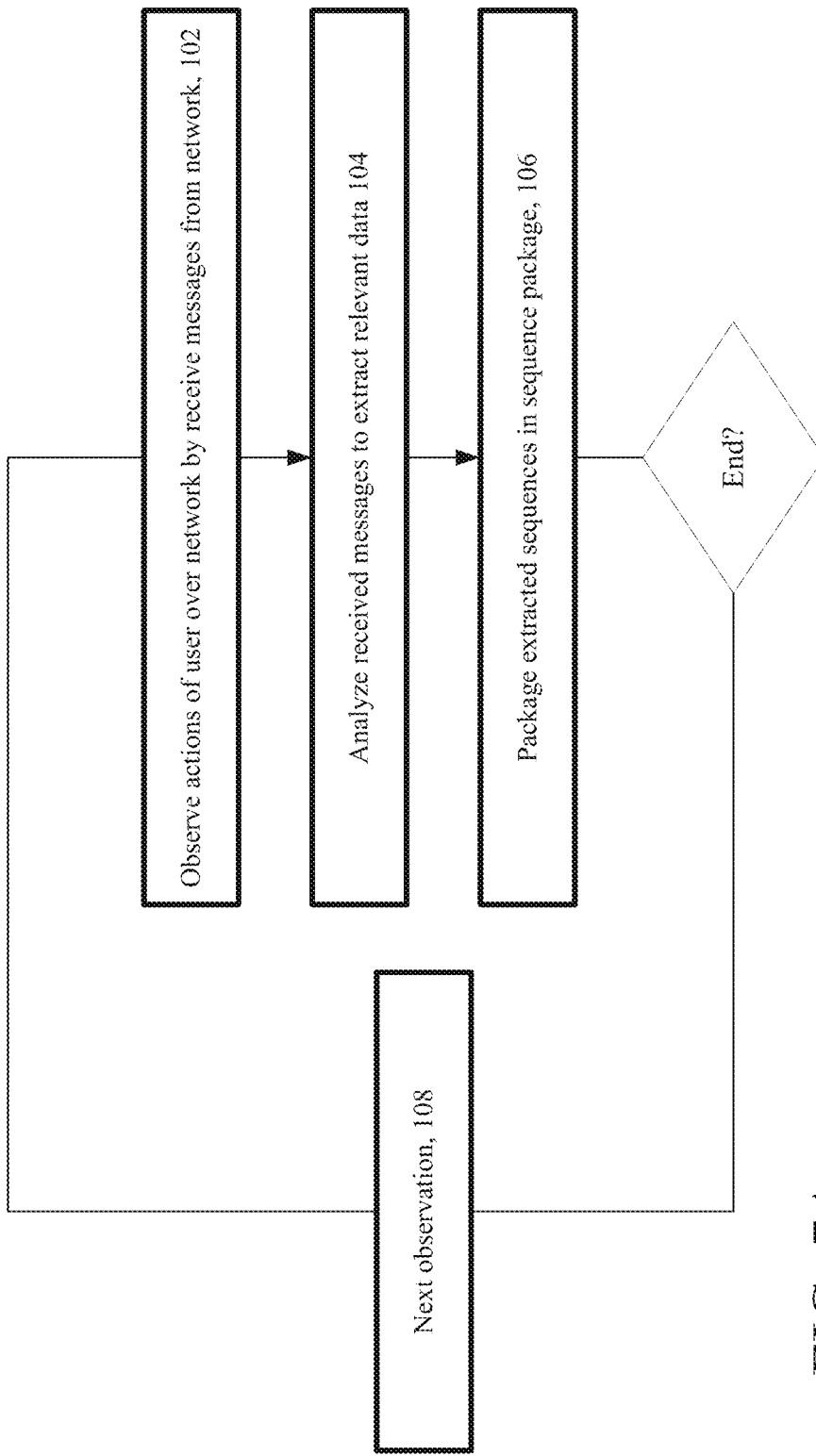
FIGS. 7A-7E are flow charts useful for understanding a training process carried out by the system of FIG. 7.

Referring now to FIG. 7A, set forth is a process that is useful for producing MSU behaviors by analysis of data streams produced when human users operate the robot. The process, at the simplest level, envisions the capture and playback of arbitrary sequences of user actions. For example, the user might pick up a screwdriver, place a screw in a hole, and proceed to tighten it down. This sequence could be recorded and played back with minimal changes if the environment were the same on repeated actions. This is the most basic level addressed by the invention.

More specifically, the process 100 involves a machine learning system to observe 102 repetition of the same sequence, analyze 104 a set of captured sequences for the same task. The machine learning system captures and extracts useful common elements about the sequence and produces better and more reliable sequences 106 using the extracted elements. The process continually observes the human. Thus, for each new observation 108 the process repeats.

More specifically, the observation feature 142 (see FIG. 7C) involves, each time an operator performs a task, the recording of the dynamics of the task in a database, e.g., database 84 (FIG. 7). The data includes but is not limited to all dynamic movements of the MSU 20a and human, which would be captured in video data and audio data. Also included would be environment data such as temperature, humidity, lighting, etc. In addition, other data includes task ratings, object definitions, spatial sensors, kinetic sensors and kinematic sensors, as well as chemical sensors—akin to human sense of smell, and electromechanical sensors—joint angle/position, motor power usage, etc. Also included would be eye tracking and electroencephalography sensors. The process envisions capturing similar data from the user and other users for the same action.

Once this information is captured, the information is analyzed 104 by the machine learning system to produce better sequences. The approach discussed below is used to analyze the capture data.

Figures 7B, 7C:
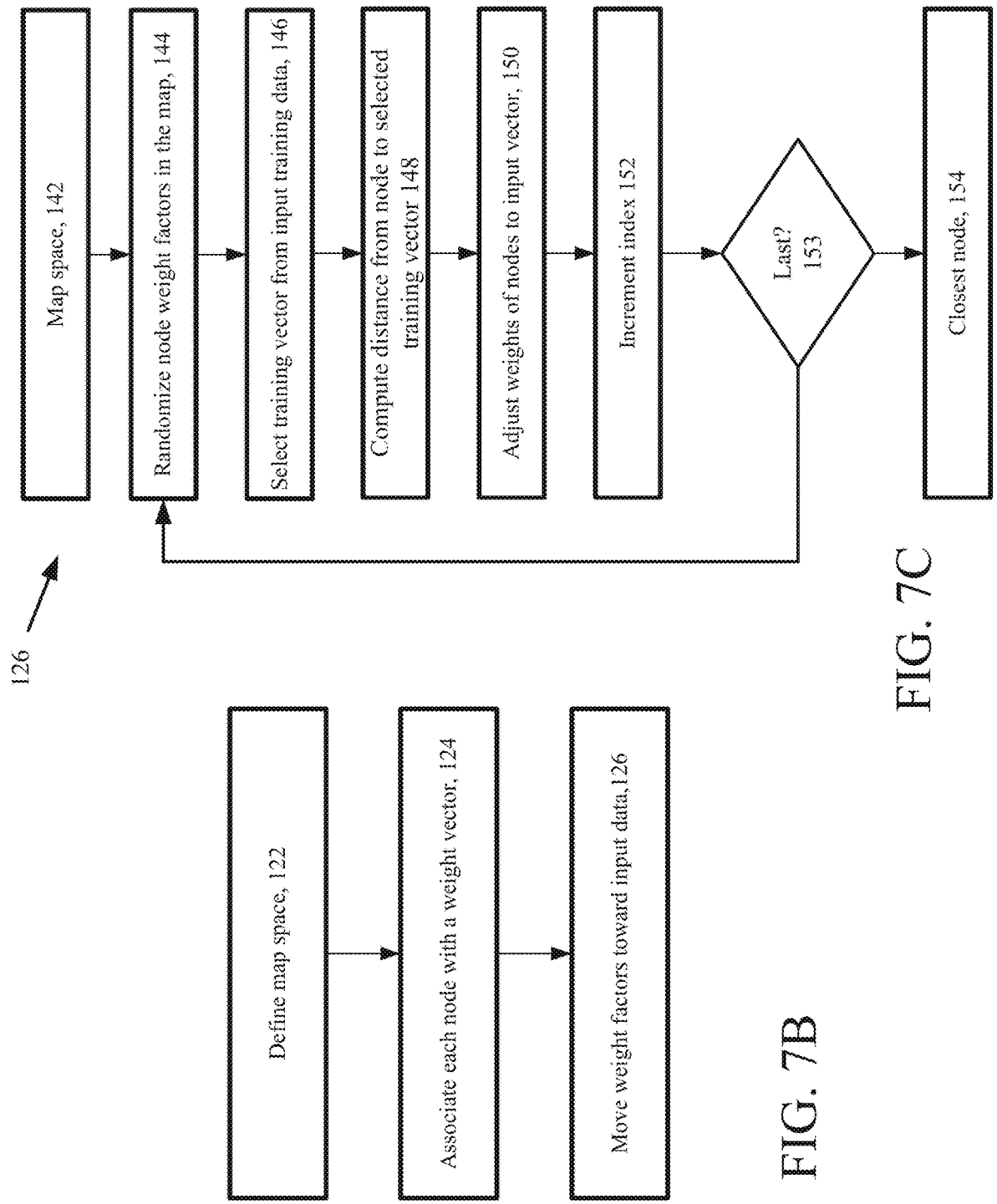

Referring now to FIG. 7B, the map space is defined 122 beforehand as a finite two-dimensional region of nodes, where the nodes are arranged in a grid. A training vector is randomly selected from training data input (a series of movements, etc. captured by the central server 82 or the AI engine 80 from FIG. 7). Each node in the grid is associated 124 with a weight vector that is a position in the input space. The vector that is chosen at random from training data is used to compare to other vectors to calculate which one's weight is most like the selected training vector. The two-dimensional region is trained using the weight vectors by moving 126 the weight vectors towards the input data by reducing a distance metric without spoiling the topology of the map space.

Referring now to FIG. 7C, the self-organizing map uses competitive learning. When a training example is fed to the self-organizing map 142, different parts of the self-organizing map respond similarly to certain input patterns. Randomize 144 the node weight factors in the map. A training vector is randomly selected 146 from training data input (a series of movements, etc. captured by the central server 82 or the AI engine 80). The training vector's distance from each node in the map is computed 148 and the node whose weight is closest to that of the training example is the best matching unit. The weights of the best matching unit and nodes closest to the best matching unit are adjusted 150 towards the input vector. This process is repeated many times by the AI engine 80.

In general, there will be one single node, i.e., the closest node, that is declared 154 as the winning node, e.g., at the end or limit condition being met. The winning node is the node whose weight vector lies closest to the associated input vector. This node is then packaged 106 (FIG. 7A) into the packaged sequence action. The packaged sequence is indexed or otherwise stored in a manner by which it can be retrieved.

The user may wish to perform and record more complex behaviors, such as disassembly or assembly of a device, mixing of chemicals, or preparation of foodstuffs, to name a few possibilities. The machine learning system will perform the same sequence of capturing information, analysis of the captured information and packaging the information into sequences as for simpler tasks, and ultimately extracting a core set of generalized behaviors that are represented as packaged sequences that accurately and efficiently replicate the proposed task.

Figure 7E:
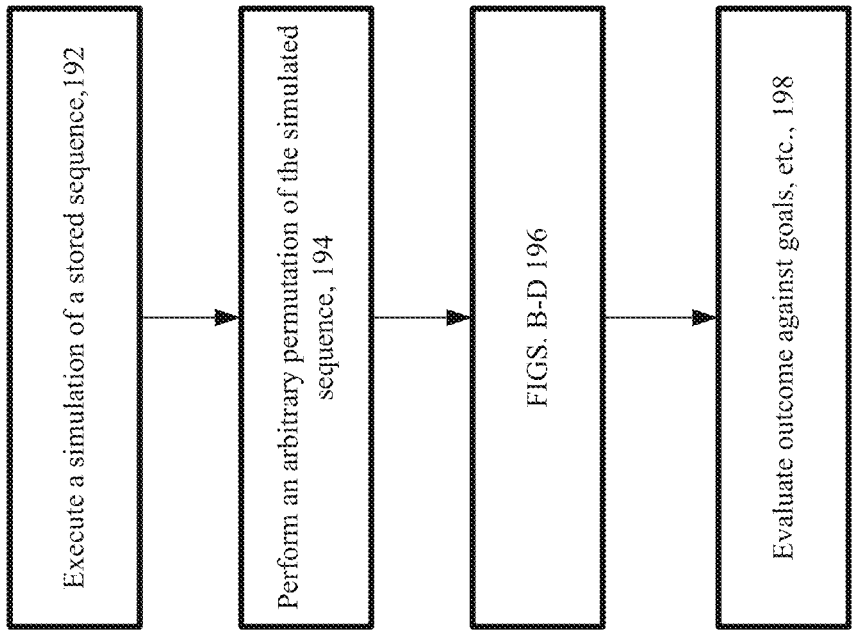
Figure 7D:
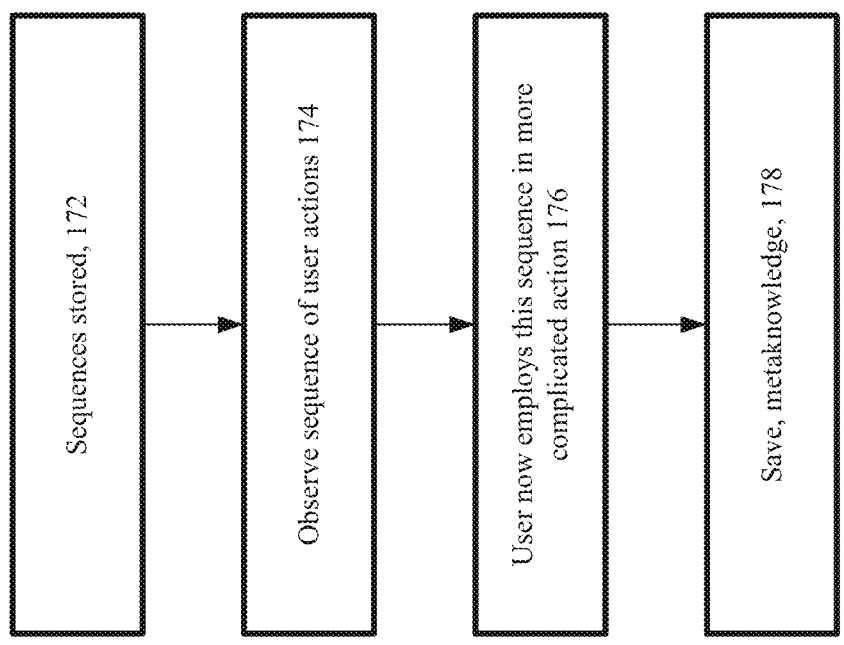

Referring now to FIG. 7D, the machine learning system stores 172 these sequences. The machine learning system also has the ability to combine simpler actions during the recording of more complex actions, thus providing additional conceptual data that the machine learning algorithms can use to further optimize and generalize their sequences.

For example, assume the AI engine 80 observes 174 that a user assembled a device that requires drilling tap holes, connecting components with screws, and adding knobs. The AI engine 80 previously recorded these actions as a sequence in which each of those three subtasks were previously learned by the system. This additional informational context that the user wishes to employ 176 these sequences to provide another more complicated sequence, allows the machine learning system to retain useful meta-knowledge 178 that these sequences were part of an additional, more complicated sequence and also be able to perform advanced reasoning to adapt to varying conditions in the physical world as a given sequence is played back.

Conversely, real-world data streams may be "noisy." That is, real world data streams may contain data points that appear to be in error or out of expected ranges. The system, as described herein, incorporates mechanisms for minimizing such noisy content. The AI engine 80 can observe multiple training data sequences and generalize behaviors in a manner that helps them understand which elements of a sequence are important and which are simply undesirable noise. In this manner, the AI engine 80 can produce sequences that are more efficient, reliable and optimal.

Another aspect of "noisy" data is that during startup and shutdown of a sequence may involve significant time spent performing tasks that are not directly related to the task that is to be trained. Therefore, the user designates a "start point" and "stop point" for any given sequence, if desired. A second, related feature is that the human operator will be able to optionally "pause" the recording for any reason, indicating to the machine learning system that data point capture should be suspended for a period of time.

Referring, now to FIG. 7E, not all training need take place in the actual, physical world. The AI engine 80 applies equally to the recording of data streams produced within real or simulated environments. Some high-risk sequences, for example, may be best performed in simulation under controlled conditions before being attempted in the physical world. The AI engine 80 executes a simulation 192 of a high-risk sequence. The AI engine 80 optimizes that sequence initially learned from humans. The AI engine 80 optimizes by performing 194 arbitrary permutations within the simulated world. Using the arbitrary permutations, the AI engine applies 196 the processing of FIGS. 7B-7D.

Subsequently, the AI engine 80 evaluates 198 whether the sequence 196 is able to achieve its goals under widely varying conditions and/or anticipate issues that might arise in the real world before they are actually experienced by humans. This approach would reduce the time required to make the training more flexible and robust and also increase safety.

Some sequences may be extremely critical—they might involve activities related to human health, to industrial safety, to environmental mitigation or to the processing of sensitive personal information. In such cases, the AI engine 80 uses automated tests in order to establish solid boundaries and minimal performance parameters for these critical sequences. The AI engine 80 could also perform automated, periodic certification of sequences to ensure that the sequences meet specific, human-established performance parameters and can be trusted to perform the tasks for which they were produced to perform.

Another feature of the AI engine 80 is that the AI engine 80 produces optimal sequences that can then be used by users. The AI engine 80 also provides recommendations to users in order to help them perform better. The AI engine 80, for example, evaluates the actions of dozens of individuals performing the same task, and ranks their performance using a set of appropriate measures either provided by users or learned by the machine learning system.

Not every user will make use of exactly the same set of tools or MSU capabilities in each operation. Similar to the example above, another value of the AI engine 80 is that it can evaluate the performance of the same sequences performed with different robots and determine which features are most useful. The result of such an analysis can save money, increase safety or increase speed, to name a few potential outcomes. The machine learning system, in this manner, is able to perform massively complex analyses of very large data sets and establish sensible recommendations that improve processes on a continuous basis.

For instance, a novice tennis player acting through the MSU 20*a* that was trained with a tennis package could play tennis like an expert, via the assistance of the AI engine 80, which has been learned via numerous tennis players playing tennis. The AI engine 80 could use augmented vision to show where the ball will hit and where best to position to hit the ball. It could also adjust the speed and direction of the MSU arm and hand action so that as the human seeks to hit the ball they do so with the skill of previous tennis players.

The AI engine 80 can be used to drive advancement of autonomous humanoid mobility surrogate units. The AI engine 80 will advance by continuing to learn new skills from human operation of MSU, as well as learn from each autonomous humanoid surrogate powered in part by the AI engine 80. This synergistic relationship means that the AI engine 80 software and hierarchical library of physical actions and skills stored in database 84 can be uploaded to various data centers and downloaded to wide range of AI platforms.

In addition, the human may choose to help in this training function via verbal, motion, or other inputs to help in the advancement of the AI engine 80 to gain autonomy. The AI engine 80 thus will grow from augmenting a person using MSU to ultimately being able to perform numerous tasks in an MSU unaided, as well as being applied to other systems outside the MSU. Use of AI engine 80 in these other systems may advance in those systems, and be applied back to AI engine 80, such that the AI engine 80 can further grow. All along the way from first observing, then helping to complete actions, to augmenting those actions, to autonomous actions the capabilities of AI engine 80 will grow as AI engine 80 is used by various human operators performing various tasks in the MSU.

For example, certain human skills can be acquired from humans, then packaged in AI-based software, and then transferred to a wide range of humanoid autonomous surrogate units in addition to an MSU. The actions taken by these autonomous surrogates can be further recorded and used to enhance the AI engine 80, as well as future versions of autonomous AI. A service fee can be charged for these upgraded skills, or the upgraded skills can be provided for free.

A data center accumulates human skills data, stores this data, and processes this data to produce AI engine 80 AI algorithms (both offline and in real time), These AI engine 80 AI algorithms can be uploaded and downloaded between the AI engine 80 and the MSU, providing ever advancing skill sets and decreasing latency of execution of skills. It is envisioned that, eventually, certain functions of the AI engine 80 will evolve so that the AI engine 80 can complete part or all of given tasks; in other words, the AI engine 80 will evolve to a point where it can act nearly or completely autonomously.

Low-Latency Computer Vision Platform

Described is a machine intelligence system 210 for compressing and transmitting real time video data with very low latency. Rather than transmitting video data as a sequence of large, compressed images, machine learning algorithms are used for transmission of the video data that will reduce transmission time by a significant amount beyond the level that can be achieved through standard means of data compression. The remote operator of the camera will see what appears to be a real-time high-definition processed image and the lag will be significantly less than with conventional approaches.

Figure 8:
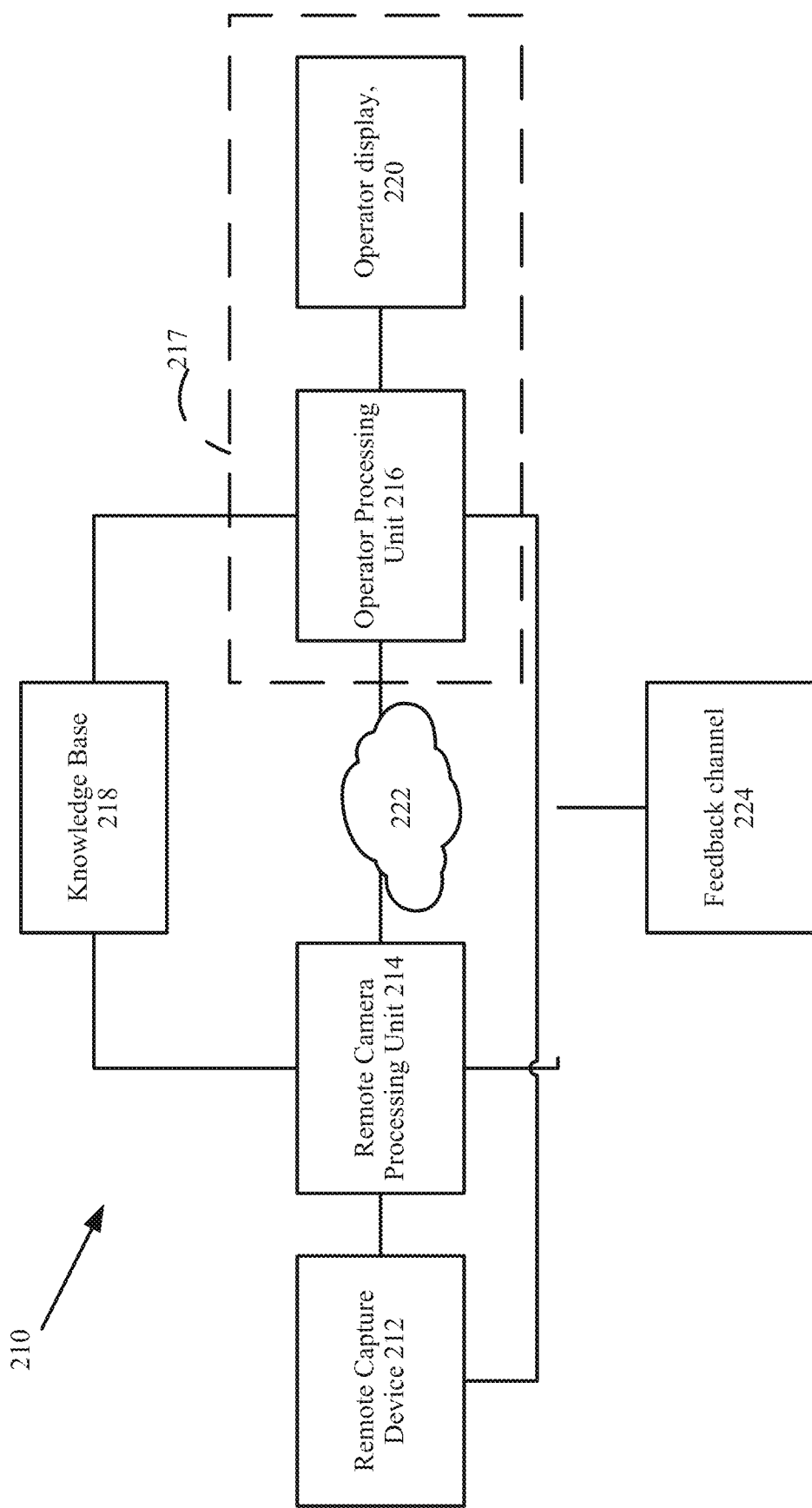
FIG. 8 is a block diagram of a remote vision processing system

Referring now to FIG. 8, the machine intelligence system 210 is shown to include a remote capture device 212 that includes one or more sensors that captures sensor data, e.g., a camera, etc. The remote capture device 212 is coupled to a remote camera processing unit 214 that uses machine intelligence to select only those elements of the captured sensor data that the device 214 determines as necessary to the viewer. The remote camera processing unit 214 performs actions dictated by machine intelligence encoded in knowledge base 218 to transmit optimized imagery of a scene and related metadata via network 222 (which can be network 24) to the operator system 217 for reconstruction and display.

The operator system 217 includes an operator processing unit 216 that receives the transmitted data and uses the transmitted data to reconstruct the scene in real time for display on operator display 220. This may involve additional machine intelligence, provided by knowledge base 218, to prioritize the elements of the scene that require reconstruction. Reconstruction may also involve the communication of non-visual information, such as a warning about a problematic issue flagged by the machine intelligence system 210.

The operator processing unit 216 may also choose to provide feedback via a feedback channel 224 to the remote capture system 212 and operator display 220 regarding the actions of the user, in order to provide additional context that can inform the machine learning system 210 in its decision-making process. The machine intelligence system 210 applies machine intelligence to the specific problem of determining what constitutes "necessary" and "interesting" information in a visual scene. As such, one of the machine learning algorithms includes an object recognition algorithm.

Referring now to FIG. 8A, a process 230 of capturing begins by recognizing that the scene is not simply a camera pointed at a location in the physical world and capturing a simple sequence of images. Remote capture device 212 captures 232 information regarding a scene. While remote capture device 212 may be a single camera, generally the remote capture device is a set of cameras, and may also include sensors of a non-visual nature such as audio sensors plus Lidar (light detection and ranging), radar, infrared and environmental sensors for capturing temperature, humidity and specific chemical signatures. The output of the capture device, therefore, is a complex data stream with multiple components, at least one of which is typically video. The capture device may also include a stereo camera, e.g., a camera with more than one lens and more than one image sensor to simulate human binocular vision. The data stream produced also includes 234 information provided via feedback channel 214.

Remote camera processing unit 214 employs machine intelligence to prepare 236 the data stream for transmission over the network 222. The machine intelligence will be trained to use knowledge of how humans perceive the world in order to select aspects of the data stream that are most valuable. By way of example, current video compression schemes make use of simpler versions of such information to reduce the size of the data that they process. For example, they know that in YUV color space some components are more important than others, so they reduce the fidelity of the parts that humans will not notice are of lower quality. Unlike that simple example, the machine intelligence system 210 operates over a broader range of inputs and also optionally on knowledge of the intent of the operator in performing a given set of tasks.

To answer the question of what is "interesting", a machine learning algorithm applies its knowledge to all sensor data to select elements of the scene that are likely to be ones upon which the user will focus attention. Thus, the machine learning system will parse 238 the data stream into at least two components, according to the type of data that is present in the stream. The machine learning system will select 240 a set of knowledge inputs to apply to each of the at least two components, in order to optimize the at least two components for transmission over the network 222, and filter/optimize according to the selected sets of knowledge inputs 242.

By way of example but not limitation, the machine learning algorithm could include one or more of the following knowledge sets.

Image Knowledge Set

Detect objects that are in the "foreground" of the scene and therefore more likely to be items that the user will interact. Detect elements of the scene that are static in nature and minimally changing, such as walls or windows, especially those that are not in the foreground, and consider them as not interesting. Detect which objects contain writing that the user might wish to read, such as signs or pieces of paper being held by a person, and prioritize higher resolution for those items so the user will be able to read the text more easily. Detect parts of the scene where the user has recently focused attention and prioritize the inclusion of additional data about those areas; such information can be obtained via feedback channel 224.

Visual Knowledge Set

The machine learning algorithms use knowledge of human vision systems to selectively reduce the fidelity of captured data outside of the "foveal region" of the operator's eyes (the region which has the highest density of rods and cones and is therefore most able to perceive details). Using knowledge of how humans process peripheral vision to inform their perceptions of the locations and relationships of objects, machine learning algorithms can filter out or abstract or otherwise adjust the detail level of elements that are at the "edges of vision" yet still important to giving the operator clear situational awareness of the remote location. Detect overly dark or overly bright regions of the scene and adjusting intensity to make those regions more perceptible to the operator. This process could also optionally include transmitting data back to remote capture device 212 in order to assist the remote capture device 212 to adjust its capture parameters such as lens aperture and shutter speed.

Environmental Knowledge Set

The machine learning algorithm could include detecting aspects of the scene that are exhibiting unusual temperature gradients, such as heat coming from a computer in a rack that is about to fail, and either providing additional detail or producing special metadata that can be used to communicate a warning to the operator. Detect dangers and prioritize information needed to communicate those to the operator, such as a fast-approaching vehicle or a falling object. Detect the locations of each human in the scene and prioritize audio data from humans who are currently speaking. Detect background audio noise and isolate sources of the noise so that they can be actively suppressed.

Subject Knowledge Set

The machine learning algorithm could include identifying humans in the scene and prioritizing the display on operator display 200 of key elements of their forms, such as faces and expressions that are important for communicating with those individuals, and identifying other living items and determining if they are of interest to the remote operator or to other persons in the local scene. Determine if any anomalous behavior is taking place (a person is in distress or is attacking another person). Identify anomalous activity of humans or other living items in the scene, for example, a dog in a manufacturing facility or a snake on the floor of a bedroom, etc.

Task Knowledge Set

The machine intelligence system will use its knowledge of human behavior and of the specific task being performed, codified in knowledge base 218, plus optionally information about the user's intent, to prioritize elements of the scene that are "necessary." By way of example but not limitation, such determinations could include identifying locations of all obstructions in the remote physical location so that a moving device can avoid collisions. Identify key elements of the remote physical location, such as doors, and determine their characteristics with high accuracy in order to enable a remote device to navigate reliably through them without collisions. Identify key elements of the remote physical location, such as floors, walls and ceilings, to ensure that they are always rendered accurately to the operator and that their relationships are clearly represented even if they are not otherwise "interesting." Identify that certain items in the visual scene are humans with whom the remote operator may wish to interact.

Conversely, identify items in the scene that are not interesting humans, such as persons who are distant or parts of large crowds. Identify images that appear to be human but are actually not human, such as life-sized photographs including image of part or all of one or more humans. The same process, for non-human living elements.

Metadata

The machine learning system 210 uses information from the knowledge base 218 to produce application-specific metadata such as temperature information, spatial relationship information or other information that is applicable to the specific task the remote operator is attempting to perform.

Filtering

The remote camera processing unit 214 uses the machine-learning information sets described above to filter and optimize 242 the raw input data streams from remote capture device 212 in order to generate the output data stream sent via the network 222 to the operator processing system 217.

Optimizations may include but are not limited to the following:

Selecting only subsections of the captured video image to compress and send to operator processing unit 216. Determining quality levels to be used in compressing different regions of the video stream and applying those prior to sending. Converting raw video data to completely different forms, such as polygon meshes and textures or voxel representations, if appropriate, in order to optimize the amount of data required to represent them. Determining appropriate resolution for non-video data, such as infrared overlays, to optimize their compression. Prioritizing multi-pass compression of data so that low-resolution data is sent first and higher-resolution data follows at a later time, in order to reduce the perception of latency on the part of the operator. This can be applied to any type of data: visual, auditory, or sensor data.

Determining how best to merge data streams from multiple video capture devices, such as a 3D front-facing camera and a 360-degree wide-angle camera and a top-down camera. Such actions might include "stitching" together a high-resolution forward view with lower-resolution views captured by a wide-angle camera in order to provide the operator with what appears to be a single, seamless wide-angle view.

Filtering out uninteresting or unnecessary audio data. Filtering out uninteresting or unnecessary sensor data such as temperatures, distances and the like. Removing entire frames of visual data so that interpolation can be used to reconstruct effective equivalents in the operator processing unit 216 despite the lack of actual data for the given frames. Providing feedback from the operator processing unit 216 to the remote capture device 212 and/or the remote camera processing unit 220 in order to provide these devices with information that can enhance their knowledge of the operator's tasks or intentions and therefore allow the machine learning system to apply additional techniques for optimizing the size and latency of the generated data stream to be sent via network 222.

Having optimized 242 the received input data set, the optimized input data set is now transmitted 244 over the network 222 to the receiver, e.g., the operator processing system 217. The operator processing system 217, e.g., operator processing unit 216, reconstitutes the optimized input data stream, for use on the platform.

Mobility Surrogate Unit Service

Figure 9:
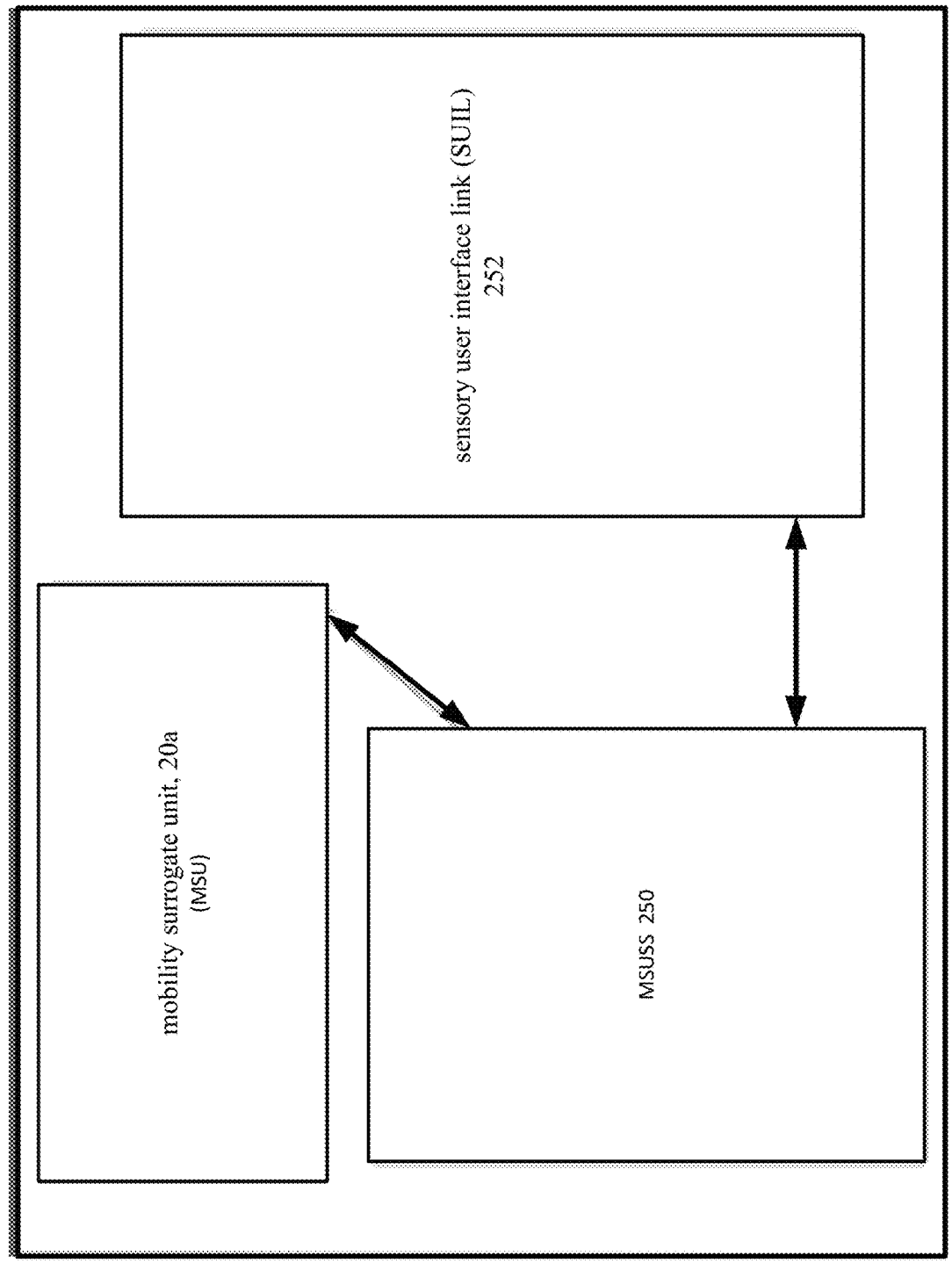
FIG. 9 is a block diagram of showing aspects of a mobility surrogate unit service system.

Referring now to FIG. 9, a mobility surrogate unit service system enables instant digital transportation of humans by acting through one or more MSU'S, e.g., MSU 20a at a location of the MSU 20a while the human is physically residing remote from the MSU 20a. A mobility surrogate unit service system (MSUSS) 250 includes a suite of software applications that MSU owners and renters can register, receive an account, and then use the MSUSS 250 in a variety of ways through a sensory user interface link (SUIL) 247.

Categories of use include "internal" use by owners or leasers of the hardware—such as by business, corporations, government, organizations, etc. Another use is "external" use—such as rental use by people outside of an entity for a range of use cases—travel, social, exploration, art, etc., and a third use is "employment" use—such as for third parties to operate the MSU 20a to perform tasks for individuals, factors, manufacturing, small business, corporations, education, medical, work centers, personal services, and a fourth use is "volunteer" use—such as for education, healthcare, social good, etc.

For example, in the external use category a registered user can rent MSU's that have been registered and linked into the MSUSS 250 and then through a set of hardware (such as virtual reality headset, audio input and output hardware, and some form of motion control and optional haptics and other sensory inputs such as smell and taste) take control of the MSU 20a, so that they can tele-operate the MSU 20a.

Likewise, for the internal use category, the same software platform can also be used in similar fashion by owners of MSU's for their own use or for the use by family, friends, guests, employees, etc.

The MSUSS 250 enables control of the MSU's, with data flowing from the user to the MSU 20a (data being of motion, audio, visual, etc.) and data flowing from the MSU to the user (such as visual, haptic, audio) and have the entire experience to be recorded and analyzed.

This so called "user archived" data can be used in a variety of ways, such as for replay, data mining, and re-experience. The MSUSS 250 enables a user to relive such experiences via a virtual reality system or a mixed reality system. The user archived data also allows for data mining of the real-world experiences—gathering data akin to that which is gathered in smart cities, but in this case from a first-person perspective.

This method of data gathering provides the data gathered from each user, which can be used to determine how people are interacting and their activities in a city via the MSU's.

The data collected can also be used to train the AI subconscious (discussed above). The motion, visual, audio, and haptic (and potentially other sensory data) can be used via machine learning to train the AI subconscious such that over time, the AI subconscious learns from each user experience. Eventually, this AI subconscious can be installed into the MSU's, and assist the MSU functions.

Also envisioned is that either the user or third parties can assist the AI in the learning process, such as by identifying tasks that the MSU is doing via human operator.

The AI subconscious evolves in several steps. Among those steps are (1) Observe and Learn, reach a state where it can (2) reduce latency of operator, then after many users completing the same task (3) augment users doing such tasks, and evolve to a point where it can (4) complete such tasks autonomously. For instance, as the AI subconscious evolves it will reach a state where it has learned enough to reduce latency of recognizing tasks—certain motions or activities, such as walking, picking up a certain object, opening door, etc.—and moving to help user complete that task in case data instructions are intermittent or are inaccurate.

The AI subconscious be used to augment a user's skill level. Augmentation will come from collecting and learning from all the activity of all the users of MSU's doing certain tasks. The MSU will enable autonomous functioning of a wide range of tasks. The system and MSUSS 250 is designed to facilitate feeding data into machine learning AI subconscious that reside in the "cloud" and feeding back the upgraded AI into the MSU 20a periodically. Such upgrades may be free or be at some cost, may be rented or purchased, etc. This same AI could be marketed outside of MSU 20a use into a wide range of robotic-type systems.

The MSUSS 250 will enable those who wish to purchase or lease an MSU, new or used, to do so through the MSUSS 250 and to obtain financing, in the same way that some car sales platforms have built in financing. Financing from outside the MSUSS 250 will also be enabled. Through the MSUSS 250, one could rent enhanced skills once the AI has been trained up.

Figure 10:
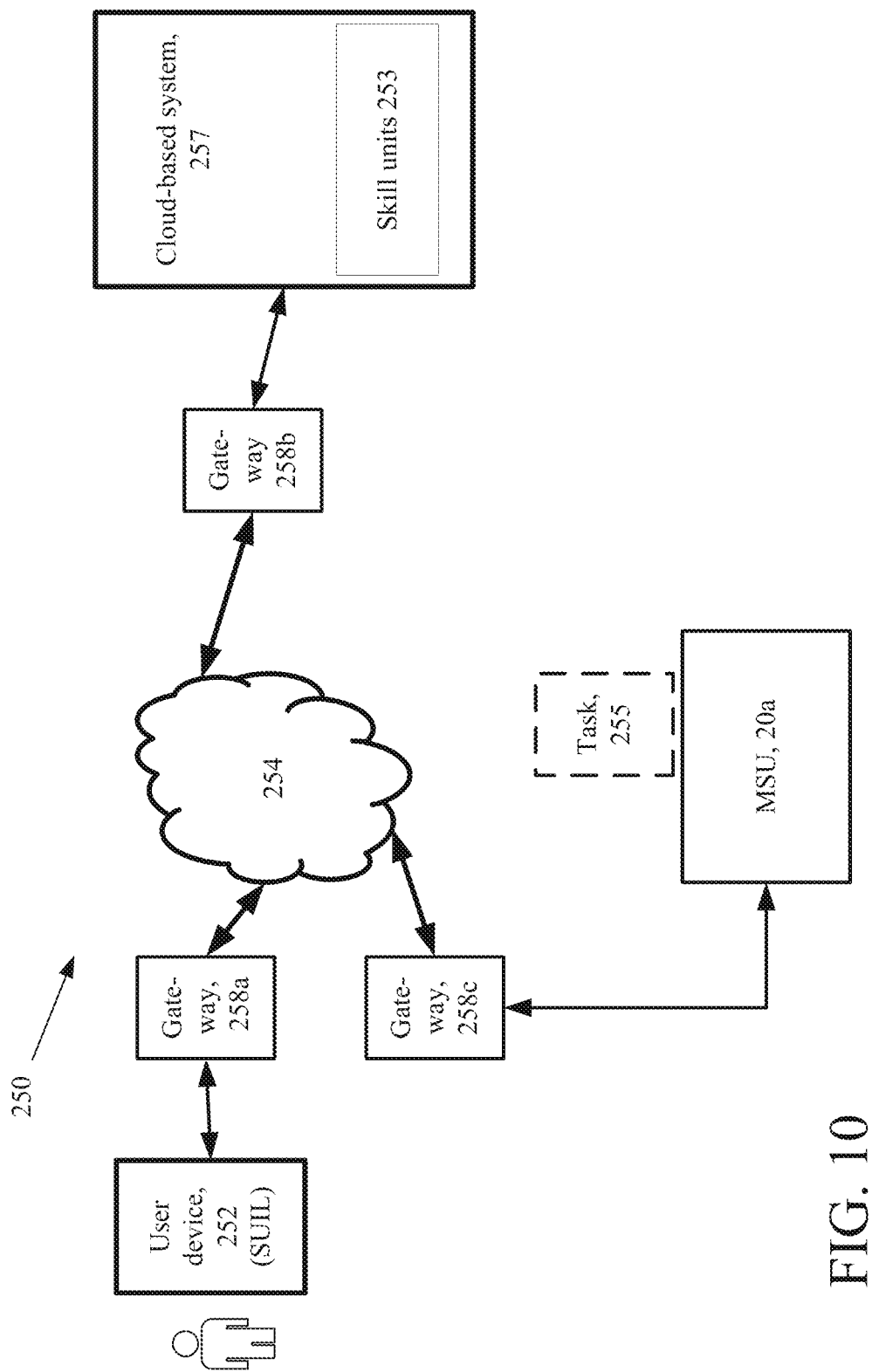
FIG. 10 is a block diagram useful for understanding the mobility surrogate unit service system.

Referring now to FIG. 10, the mobility surrogate unit service system (MSUSS) 250 is shown. The mobility surrogate unit service system 250 includes a user device 252 (e.g., a SUIL), a network 254 and a cloud-based system 257 that receives data, processes the received data into a plurality of skill units 253 and stores the plurality of skill units 253 in cloud based storage. A skill unit 253 is a series of computer instructions (and associated data, if any) that when loaded on and executed by the MSU 20a cause the MSU 20a to perform a certain task 255. Skill units 253 can be downloaded into the MSU 20a, e.g., for a fee; upon downloading of the skill unit 253 into the MSU 20a, the MSU 20a performs the associated task 255. These features receive messages over the network, e.g., though gateways 258a-258c.

Figure 11:
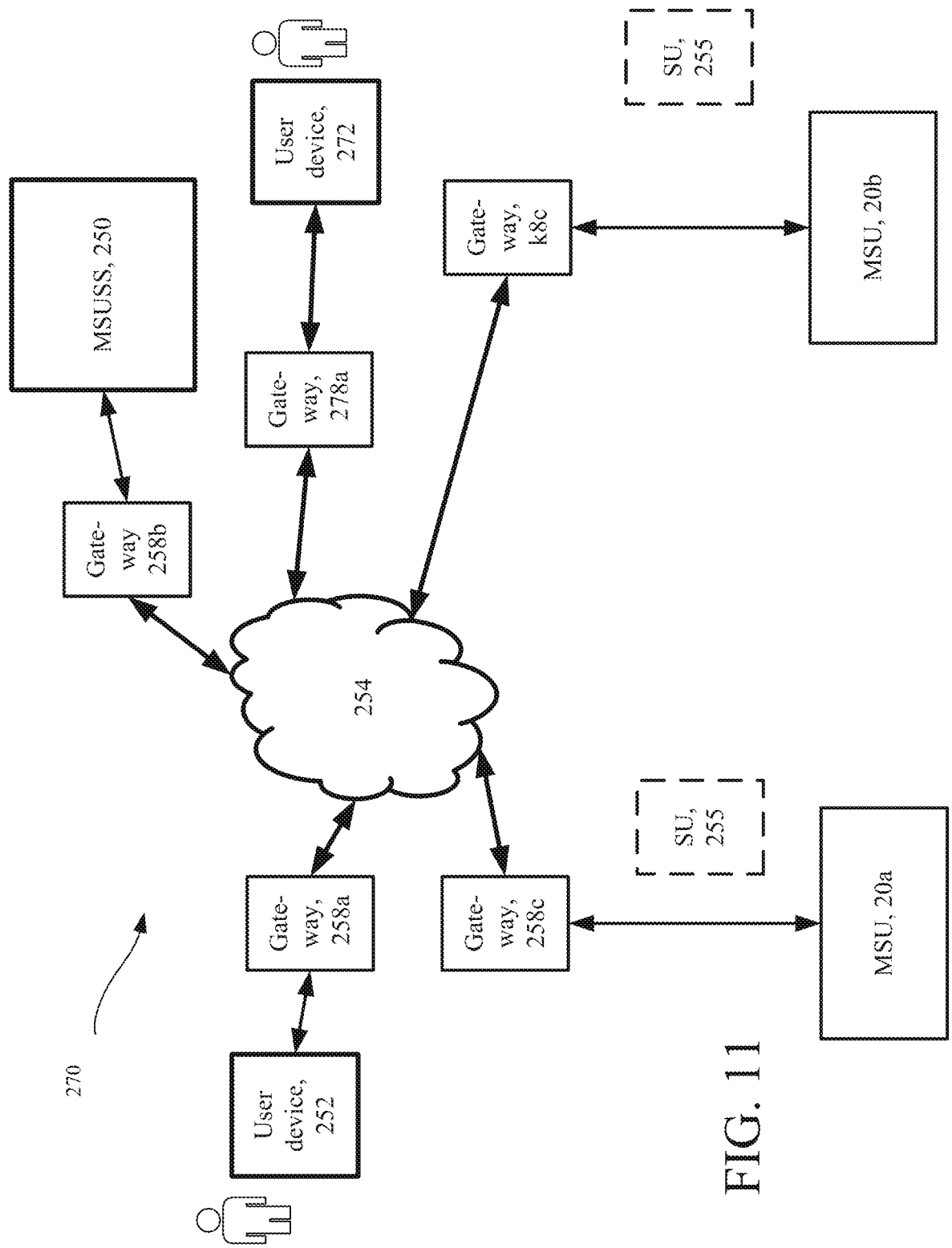
FIG. 11 is block diagram useful for understanding the mobility surrogate unit service system with two mobility surrogate units.

Referring now also to FIG. 11, system 270 is shown. System 270 includes the features of system 250, such as the user device 252 (e.g., a SUIL), the MSUSS 250 and MSU 20a, all coupled via gateways 258a-258c to network 254. Now consider that the downloaded skill unit is a tennis player skill unit 255. The user causes the download of the skill unit into the MSU 20a. Upon successful download and installation of the tennis skill unit, the user, via the user device 252, controls the MSU 20a. The user initiates a game of tennis with either another user or as shown another MSU 20b. User 272 and MSU 20b are coupled via gateways 278a and 278b to network 254.

The user controls the MSU 20a to control a swing. The swing will be based on the computer instructions in the skill unit 255 that was downloaded and installed in the MSU 20a. Similarly, for the MSU 20b the ball returned by the swing from MSU 20a will be met by a return swing from MSU 20b, but being controlled by the user of a user device 272. Any other task would be provided in a similar manner. The system will offer skill units from a range of vendors.

The MSU can possess autonomous functions. A user can select a machine learning skill unit that turns the MSU into a waiter, a cook a maid, a doctor, etc., provided those abilities have been trained into the MSU, as discussed above.

The MSUSS 250 records in a user's account the amount of training data that a user has contributed during their use of an MSU. By this is meant that as a user uses, e.g., the MSU 20a, data is uploaded and tagged with a user ID so that the system tracks each registered user's contribution. The MSUSS 250 may credit that user via an internal credit system or some form of crypto or digital coin or other mechanism. This will motivate users to become first adopters because they can earn credits that grow in value and exceed the amount they spent to rent the surrogate.

External Use of RAU

External use of an MSU is accomplished via the MSUSS 250, which enables owners to register into the MSUSS 250 their MSU so that it can be rented by non-owners, as well as accessed by the owners and those they give free access to as they designate. This user can limit who has access to the surrogate, when access is available, what it costs to rent or lease it, or even an amount to buy the MSU. The MSUSS 250 facilitates the instant use of the MSU, through the MSUSS 250 from which it was rented.

There are several layers to the rental aspect of the MSUSS 250. Consider that person plans a party. The person wants MSU's for waiters, cooks, and performers. This person does not own any MSU's. The MSUSS 250 enables third parties who own or control an MSU to rent them out to the person's party. The person would use the MSUSS 250 to rent and have the MSU's delivered. The person would also use the MSUSS 250 to hire "pilots", i.e. the operators with the necessary skills to control the MSU's. The MSUSS 250 would have an authentication process as well as a certification process to ensure users that the pilots are skilled enough to operate the MSU's that the person has rented.

Authentication

At the base level, a user registers with their device, e.g., a smartphone or laptop computer and an email address or phone number. This gets them access to the base levels of the MSUSS 250. As part of the registration, a user would verify their identity to the MSUSS 250. This will involve providing additional information that can be used to identify the user. Body metrics such as a fingerprints, facial recognition, or retinal scans may be employed as well as other personal identifiers such as one would provide when opening a bank account.

Certification is another aspect of the registration process performed with the MSUSS 250. Now that the system has authenticated who you are, the user needs to know that the user is contracting someone with the required skill background and who knows how to provide those skills through a particular MSU class. The skill level need not be for the exact same MSU, but could be for a class of MSU's.

Certification can be performed via a virtual reality simulation of the MSU in one or more environments. The certification would involve the user performing a set of tasks; when the user reaches a required skill level, the user obtains the certification. The MSUSS 250 would enable the user to take these tests and obtain various certifications of different classes of MSU's. Numerous types of certifications are possible, and at different levels, depending on the degree of difficulty or complexity of the tasks that will be perform. The certification for a waiter could be different than that for a cook, and the one for a doctor very different and harder than either. In addition to certification that you have the skills to operate the MSU to perform the tasks you have, it may also include other metrics such as how many hours you spent in VR practicing, how many in the real word operating, etc.

The MSUSS 250 enables users or companies to market their services. These services can be various services, such as a teacher, doctor, engineer, dentist, lecturer, inspector, plumber, cook, cleaner, dancer, etc. The MSUSS 250 will enable a simple process for the marketing of any skill, placing it into the appropriate category.

Providers will be authenticated and certified (including certifications by external agencies or governmental organizations). The providers will set their service price, list their skill sets, hours of operation availability, etc. As a user's service is booked, that hour or day becomes unavailable. They system may take a small percentage of the fee paid, before sending the rest to the provider.

Another feature that could be deployed in the MSUSS 250 is a privacy function that is built into the MSU. This function takes visual data and blurs or blocks certain parts of the image to maintain the privacy of the customer and or guests, as well as any documentation that may come within a visual field of the MSU. The MSUSS 250 might replace each person's face with some augmented overlay. This overlay could in fact help the waiter identify each person in a way that helps the waiter provide the service, but at the same time keep them private. Audio could be made private as well as image or video data. For example, if a person was speaking directly to the MSU or requesting a service from the MSU, the MSU would hear the request.

Augmented image blocking is enabled through the platform. The visual camera data coming from the MSU, via the MSUSS 250, is augmented. The augmentation can be for any reason. The augmentation can be visual, audio, or even haptic modification.

AI Subconscious Platform Features

Assuming for the moment we have an AI subconscious, let's explore some of the applications in the platform. The data that is transmitted between the operator (pilot) and the MSU passes through the platform. The MSUSS 250 feeds all this data into the AI subconscious process. All the data from all MSU operations from multiple units becomes part of the learning data. As the AI subconscious grows in capabilities, it may also have AI programs based on this learning in each MSU.

Eventually the AI will advance from simply learning (stage 1 function) to stage 2, the point that it will be deployed in the MSU to reduce latency and increase quality of certain actions. This action will be in the system installed in the MSU. The system is designed to compensate for when control signals from the MSUSS 250 are slow to transmit, or dropped out. This AI function will help fill in those gaps from walking across room, to reaching and picking up object, to navigation from point a to b. At Stage 3, the system will advance to stage where it can augment or enhance the action of a user. This may be performing a simple task such as making a cut, or a complex task such as stitching a wound. The augmentation can be both physical as well as visually enhanced.

In the first stage—the learning stage—the MSUSS 250 may also perform the function of tracking what useful data a user supplied while operating an MSU. As a user operates with an MSU, the user's data advances certain traits, and the user's contribution will be tracked, and the system may provide a payment in credits or even cash for such contributions if they lead to applications that generate revenue.

After stage 3 of augmentation, eventually the system advances to Stage 4 for some activities, which become autonomous activities. These specific autonomous functions are ones again that can be associated with user or RAU. The various specific functions will continue to accumulate, building a more general-purpose autonomous robot, although not really a general AI system—instead a large collection of specific autonomous functions.

Services

One of the benefits of this MSUSS 250 is its ability to provide services. This is different than the function of a user who wants to rent an MSU for some purpose. Instead, it's a user contracting for a service they want from one or more humans. The possibility is very large—doctors, engineers, poets, cooks, cleaners, repair personnel, tennis coaches, gardeners, bartenders, etc. The MSUSS 250 is designed to enable those individuals or entities who want to offer their services to do so. Setting their costs and availability as mentioned before, it also provides for certification and authentication which we already covered.

Physical Work Centers

Another aspect of this MSUSS 250 is that it can be used to facilitate Physical Work Centers. A physical work center is similar to a call center, except that, instead of talking, the talent can perform specific tasks. The MSUSS 250 will have the ability for third parties to set up centralized as well as distributed work forces by providing them with a Sensory User Interface Link (SUIL), as discussed below, to use.

Note: this is different from a person who owns their equipment and has connectivity, and offers their services for people to order. In this case a third party is marketing and covering the base costs of the control equipment, and the operator is working for the 3rd party to fulfill tasks that have been ordered. The MSUSS 250 will take some small fee or percentage from all services provided—generating revenue for the company in each transaction.

In providing services another need is for provisioning tools that may be needed for a given task. The MSUSS 250 will check to if you have the tools. If the user does not have the tools, the tools can be rented or sold on the platform, and the MSUSS 250 will take a small fee for the service.

Companies, organizations, or even single person that owns or has possession of one or more MSUs and needs workers to operate them can advertise their worker needs, and workers who meet requirements can obtain contracts to operate the MSU's. The MSUSS 250 markets the job needs, enables worker to gain the job, and tracks workers' performance. The MSUSS 250 may also pay the worker. For this and any other work provided via the MSU that is not by workers in a company that owns the MSU, the system will take a percentage of the payment made to the worker for providing their services.

The MSUSS 250 facilitates travel, without a specific task in mind. This travel function enables users to select from a pool of available MSU's listed by entities or individuals who want to provide their MSU asset.

Another aspect is geo-fencing. Geo-fencing is the ability to select a geographic region in which the MSU will operate and within with the MSU can be confined. Conversely, depending on the nature of the task/location, geo-fencing also means the ability to prevent the MSU from entering a given area.

Projection

Some MSU's may have screens upon which a user's face can be displayed. These can be screens of any shape, size, or construction, e.g., flat screens, curved screens, depth projection screens, projection screens, etc. There may be one screen or multiple screens. These screens may be used to project the user's face or other parts of a user's body (or even their entire body).

The data that comes into these screens will primarily, but not exclusively, come from the platform. Data may also come from the MSU as well as from other outside sources. For instance, a user's face projection as an animated object could be stored on the MSU (uploaded via the platform, directly read from a data stick, or from another source). This could be a still image, but it could also be a 3D animated object that could for instance map the expressions of the operator via data sent through the MSUSS 250 as the user is operating the MSU.

On the other hand, the data could be from the internal operations of the MSU. It could also be video, audio, text, or image data that operator wants to display to those observing the MSU. Data could originate from a third party in the room or external to the room or location of the MSU. Various sources that the user of the MSU could select from could be displayed on one or more screens. In this way, the MSU could act as the portal platform. The operator of an MSU could project any image they want to be seen as the operator—and not be limited to their own face or even to being a human.

Alternatively, the user could look through an augmented reality device to see augmented objects in the real environment and the human would see what ever image the pilot has selected. This can be done directly from cloud to the augmented reality device so that not transmitting data to the MSU.

Multiple Users

Now let us consider the cases of multiple users in a single MSU. In this embodiment, two or more pilots control the MSU. They may control different aspects—like the left arm by one pilot, the right by another, and the base with another. Any portion can be controlled by one or more users depending on the use case.

Other embodiments include a lottery system that gives control to one of a group of users that are "passengers." This be useful where for instance an MSU is placed in a specific location, and numerous people see, hear, and feel via the MSU but only one gets control at a time. It could also be by a bidding system, where passengers each bid to take control of the MSU.

Digital Sensory User Interface Link to Operate and Control a Mobility Surrogate:

The system includes the MSU 20a (see FIG. 11) and the MSUSS 250 that connects an operator to the MSU 20a, via a network and a sensory unit interface link that is a system of hardware and software (VR, motion capture, haptics, audio, computer, etc.), as shown in FIG. 9.

The user's motions are synchronized with those of MSU 20a. The system can use a set position so that MSU 20a is in a starting position and the human attempts to match that position.

In the system discussed herein, a digital sensory unit interface link uses a digital avatar of the person that they can first see when the user places on a virtual reality headset on the user's head, before the user connects to the MSU. The user puts on the VR headset but does not yet see through MSU 20a eyes. Instead, the user sees a virtual room, and in this room, the user sees a digital version of the person's self, e.g., from the user's point of view.

The digital sensory unit interface link thereafter sees the MSU 20a when the digital sensory unit interface link is activated between the VR headset and the MSU's 20a camera vision. Now, the user sees through the MSU 20a's eyes and can look down and see the user's mobility surrogate body. The advantage here is that, regardless of the position of the mobility surrogate, the user can bring the user's body, arms, legs into alignment. The mobility surrogate head is the focal point, so that the mobility surrogate's head comes into alignment with the operator, ensuring that they are seeing from the same point of view.

The MSUSS 250 calls the mobility surrogate MSU 20a into any number of ready positions, and the user matches that positioning. In addition, depending on the transmission speed, there can at times be latency. In the MSUSS 250, the user can opt to see that latency—so that if the user reaches for an object the user sees the virtual—digital SUIL—hand reach for the object—but if the mobility surrogate was slow—the user's virtual reality hand might separate from mobility surrogate units—but the user knows that the user reached it and can wait for the mobility surrogate hand to catch up. The user could also have the option of issuing some command, gesture, or other signal so that the user could disengage, leaving the user's digital hand where the user wanted the MSU 20a's hand to go, and drop the user's hand, while the user waits for the mobility surrogate's hand to catch up.

When the user disengages, the user might see another digital version, e.g., a different color or fainter version, i.e., so now the user see where the mobility surrogate hand is, where the virtual digital SUIL is that the mobility surrogate hand will eventually catch up to and where user's actual hand is with respect to it all. Once mobility surrogate hand has caught up, the user can bring the user's secondary virtual SUIL back into alignment, re-sync and continue the user's actions. For another example, the user may want to at times disengage a right hand and arm or left hand and arm to take control of a joystick to control the mobility base while keeping the mobility surrogate's arms where they are. The user can move the mobility surrogate and then re-engage.

The MSU may have levels of activity it can do once it is set to a task. For instance, the user starts chopping vegetables. Once started on this task, the user could disengage and let the MSU continue with the task, while the user's arm rests, etc., or the user might be controlling additional MSUs. That is, at times the user will want engage and disengage as well as track when the user is ahead of the mobility surrogate's actions. The use of a digital SUIL that can engage and disengage, as well as separate, enables a range of activities that otherwise would not be possible.

Secure Robotics Application Private Network Adapter.

Described below is a platform that is used to securely connect an operator to a remote MSU. The platform includes several layers of authentication including personnel, device and application layers. When an operator connects to a remote MSU, it is important that the operator be subjected to the same security policies that are in place in the facility where the MSU is located, in addition to any policies in effect at the user's location. The user's connection should be resistant to intentional interruption and to intentional takeover of the control of the avatar. The user's connection should also be secure while the data from the MSU is in transit between the user and the MSU.

The user's connection to the MSU takes place in real time. That is, it will be sufficiently synchronized as to enable the user to control the avatar in a manner comparable to the way it would be controlled if the user were in the same room as the MSU with a direct connection to the MSU.

Described below is a platform that allows for a secure connection using a distributed transmission process that increases security, reliability and transmission speed compared to conventional encryption and quality-of-service (QoS) approaches. The platform uses a mix of several existing technologies to produce a synchronized distributed virtual private network (VPN) that allows for quality of service measures to be applied within the VPN on a service-by-service basis.

One aspect to consider is priority. For example, when video is traversing the VPN, the video signal will be given a high level of priority over other traffic to ensure a low-latency experience for the operator. Similarly, if voice data is traversing the VPN, it can be given slightly higher or lower priority than the video, depending on the task at hand, in order to ensure the smoothest possible experience for the operator. Other information can be given lower priority than video and audio information. Another aspect to consider is transmission paths. The distributed virtual private network relies on data being sent over multiple different paths. Another aspect to consider is encryption keys. Conventional encryption algorithms negotiate a single encryption key when producing a secure connection, and then send data over a single path.

Figure 12:
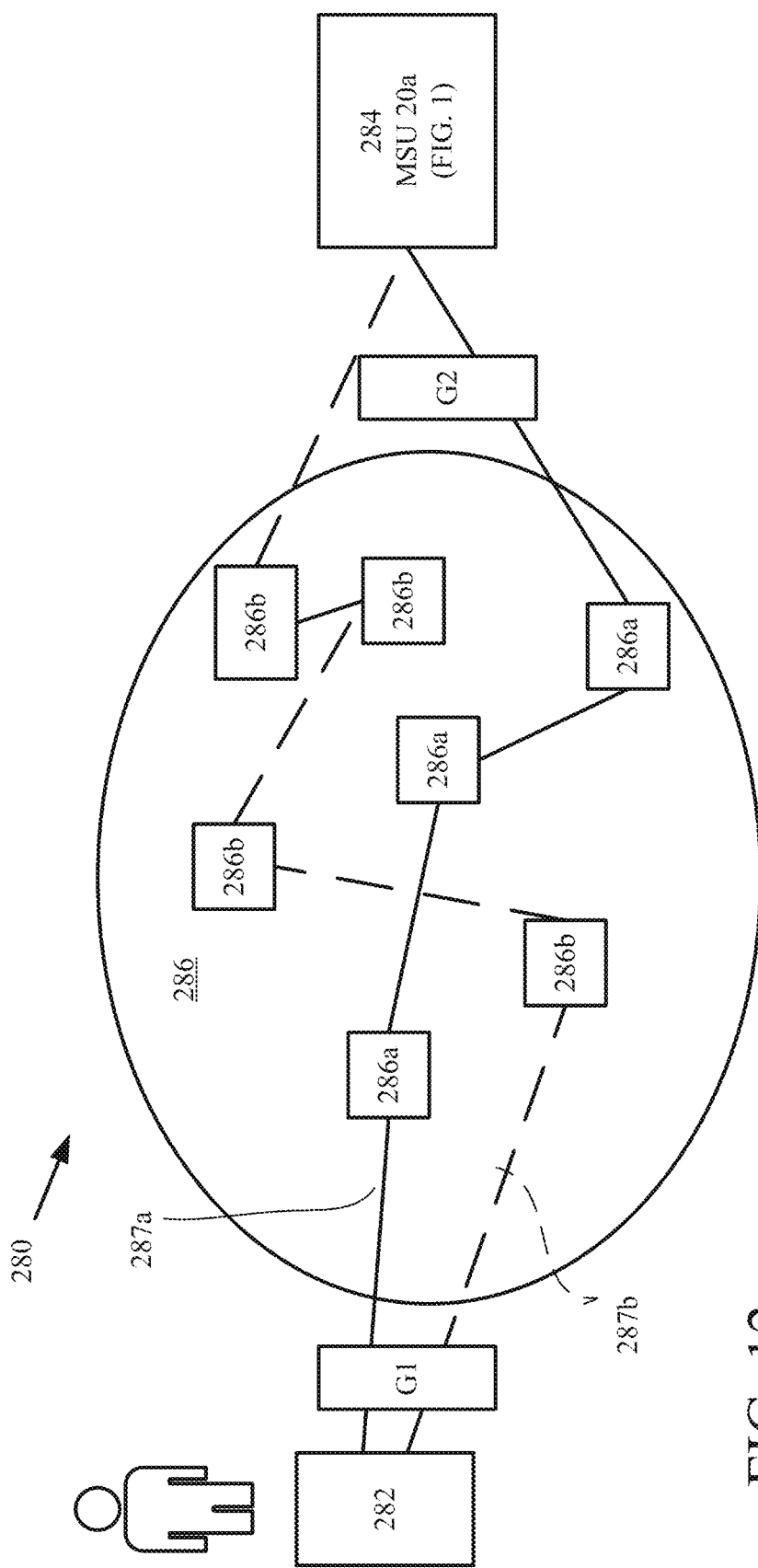
FIG. 12 is a block diagram depicting data transmission.

Referring now to FIG. 12, a platform 280 is shown. The platform includes a transmitter 282 and receiver 284 that each communicate through gateways G1 and G2, respectively to a virtual private network 286. In the transmitter 282 is a service level determiner that considers priority of transmission. Different levels of service are enabled in the platform 280. The platform 280, e.g., in the transmitter 282 or elsewhere in the platform 280 determines the types of data that are being requested for transmission and assigns levels of service to each of the different data types.

For example, a mixed data stream of video, audio and other data is provided. A first service level is to determine whether video information is traversing the VPN 286. When video is traversing the VPN 286, the video signal will be given a high level of priority over other traffic to ensure a low-latency experience for the operator. Other types of data such as voice data are given slightly higher or lower priority than the video, depending on the task at hand. Still other types of data are given lower priority than video and voice or audio information. The VPN 286 is comprised of numerous nodes 286a, 286b (routers switches, etc.) through which data traverses. Nodes 286a in FIG. 12 form a first transmission path and nodes 286b form a second, different in at least one node, transmission path. At the other end of the transmission is the receiver system 284, e.g., the MSU 20a (FIG. 1).

The transmitter system 282 splits the data transmission stream into plural segments and assigns each of the segments to one of plural transmission paths. Each segment is assigned a sequence number that provides to the segment an order of reconstitution of the segments into the data transmission stream at the receiver end. The transmitter 282 transmits the segments across different paths 287a or 287b of the VPN 286 by negotiating different transmission paths for the segments.

Prior to transmission, each of the segments is encrypted with one of several different private transmission keys. Secure transmission and reception "keys" e.g., private and public keys such as RSA or DSA or ECDSA keys could be used, for example. In addition in some embodiments symmetric encryption could be used, provided the symmetric keys are exchanged in an otherwise secure manner. The distributed virtual private network 286 relies on data being sent over multiple different paths. Transmission over multiple different paths allows for individual packets to be encrypted at lower encryption levels, because if data were compromised, it would only be a portion of the entire data stream, e.g., a small portion of a frame, but the compromise would not affect the entire data stream, and thus would not be sufficient to compromise the data.

Conventional encryption algorithms negotiate a single encryption key when producing a secure connection, and then send data over a single path. This platform uses multiple keys to achieve different goals, and implements its protocols in a unique and different manner.

Features of the multiple paths include that intermediate machines along the transmission path will vary, so that one packet might go through a particular set of three devices and the next packet would potentially go through at least one different device. Some data could be transferred over entirely different network paths, as depicted in FIG. 12, and indeed data could be transmitted over entirely different networks. For example, some data could be transferred over one type of network, such as Bluetooth, and other data in the same logical stream would use WiFi. The encryption key negotiation process might take place over more than one network, or over a channel that is not used for data transfers.

Encryption keys need not be the same for each path. In theory, each different path could use a different key, further frustrating attempts to decrypt and compromise the data stream. Certain forms of data could be encrypted with different types of encryption algorithms, some of which are more secure than others, in order to more reliably protect information that is more sensitive.

Text streams containing names or involving the transfer of documents might be secured with better algorithms because they would be easier to compromise. Portions of streams including low-resolution data might be encoded with less sophisticated algorithms that are faster, because they contain less sensitive information (in particular, no text or recognizable faces). Voice data might be encoded at a different level than video data.

Other approaches to encryption include encryption keys being periodically renegotiated during transfer, either via the same or different channels, making the capture and reliable decoding of the entire stream even more difficult; that is, if a key is overlooked, gaining access to the stream to which it applies is far more difficult. This renegotiation could be based on time, number of packets sent, or any other parameters known or knowable to both the transmitter system 282 and the receiver system 284.

Encryption could be added by intermediate devices, such that a fully encrypted version of a packet does not exist until the last step in the transfer. This would frustrate capture mechanisms that attempt to intercept data in the middle of an interchange between two the transmitter 282 and the receiver 284.

It is possible for some packets to be sent more than once. This could happen due to unstable connections that require retransmission of lost packets, but it could also be done intentionally in order to confuse someone attempting to intercept the stream. Other considerations in the encoding and transmission process may include:

Portions of encoding and decoding of data may be implemented in hardware rather than software. This could be done to increase the speed of such operations, which is useful in reducing latency. Transmission may be facilitated by leveraging existing QoS protocols that may be available in devices used in the transmission process, prioritizing the delivery of some packets over that of others.

Not all of the information sent over the various paths need be "real" data. Some of the data packets may be "decoy" packets: data packets that to an outside observer appear to be completely legitimate but are in fact contain no usable data and are inserted into the stream merely to divert attention from the real packets and delay or complicate the process of decrypting the stream.

Both transmitter 282 and receiver 284 systems would know which encryption keys were used to encrypt which data, as well as, which paths were used for data transmission, etc. Also, both the transmitter 282 and receiver 284 would know which of the data were "real" data and which of the data were "decoy" packets. That is, all variations of the transmission could be negotiated before transmission by an out of band exchange of messages between the transmitter 282 and the receiver 284.

The process of negotiating encryption/decryption keys may generate more keys than are actually needed. Consequently, it is possible that some keys will be unused during the transmission, and that attempts to decrypt data using those keys, if stolen, would not provide any useful data and would instead delay and complicate an undesired interception of the data stream. Both transmitter 282 and receiver 284 systems would know which encryption keys were used.

Authentication incorporated can be of a conventional nature. This could involve user names and passwords.

Alternative Multi User Based Applications

Discussed below are alternative multi-user based applications of the mobility surrogate concepts discussed above. These alternatives integrate the mobility surrogate concepts with the multi user scenarios described in U.S. Pat. No. 10,223,821, filed Apr. 25, 2017 by Raymond C. Kurzweil and assigned to Beyond Imagination, Inc., and the entire contents of which are incorporated herein by reference.

Figure 13:
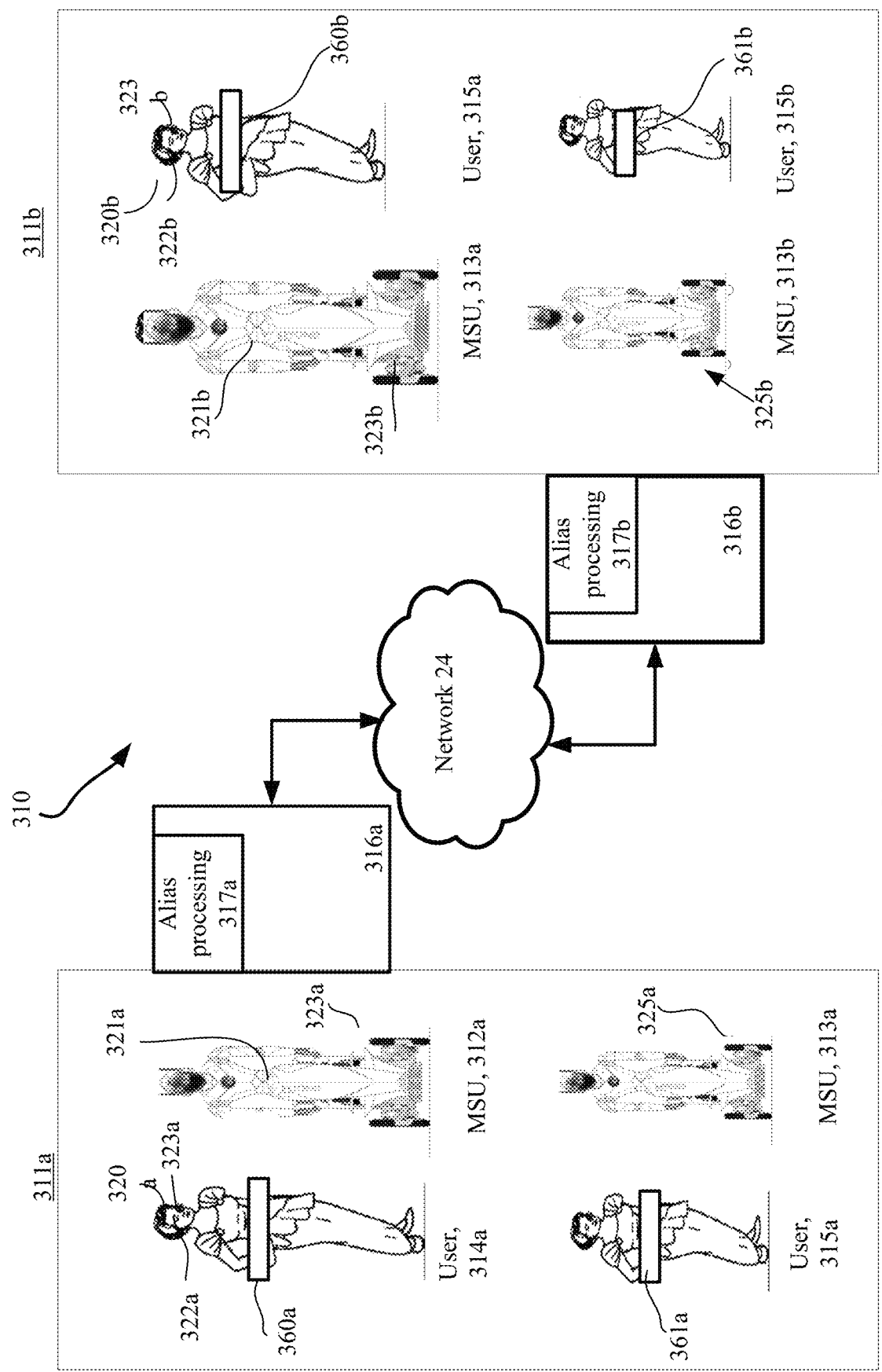
FIG. 13 is a diagrammatical view of a multi-user, multi-location virtual encounter system with mobility surrogate units.

Referring to FIG. 13, a virtual encounter system 310 includes in a first location 311a, a first surrogate platform 312a (e.g., a MSU), a first user 314a, a first communication gateway 316a, a first set of goggles 320a worn by the first user 314a, and a first pair of wireless earphones (earphone 322a and earphone 323a) also worn by first user 314a. The virtual encounter system 310 also includes at least a second location 311b. In the second location 311b are a second surrogate platform 313b (e.g., a MSU), a second user 315b, a second communication gateway 316b, a second set of goggles 320b worn by the second user 314b, and a second pair of wireless earphones (earphone 322b and earphone 323b) also worn by the second user 314b. Gateway 316a and gateway 316b are connected by a network 24 (e.g., the Internet).

At least one and generally all MSU's 312a, 312b have mobility functionality and have at least a portion of a human-like upper torso 321a, 321b that supports a human-like head (not referenced). Typically, the human-like upper torso 321a, 321b that supports a human-like head can be fabricated from humanoid form-like elements that are relatively inexpensive to manufacture and yet can convey an appearance of a human. By mobility functionality is meant the ability of the surrogate to move about a physical location.

At least one and generally all MSU's 312a, 312b, as shown, are the mobility MSU's discussed above and include a mobility base 323a, 323b to provide mobility functionality and the at least one and generally all surrogate torsos 321a, 321b, as shown, are arranged on the mobility bases 323a, 323b. Examples of mobility bases 323a, 323b can include modified, conventional electric wheelchairs, as well as more advanced bases.

These examples of mobility bases are modified to enable remote control of the bases by sending command messages across a network such as a public network, e.g., the Internet or a private network. Some examples of advanced mobility bases are those described in U.S. Pat. Nos. 5,701,965 and 7,131,706, which mobility bases are modified, as discussed herein.

These command messages would include control information (move, start, stop, climb, etc.) that controls aspects of the mobility bases as well as or in addition to control data, e.g., direction and extent or speed of travel, with specifics of the command messages being determined by the type of mobility base.

A full robotic type surrogate that includes mobility functionality, such as mentioned in connection with some of the embodiments in above mentioned publication US 2005-0130108 A1 published Jun. 16, 2005, is excluded from the meaning of surrogate as used herein. However, a robotic-type surrogate (that is a robotic torso that relies on a separate mobility platform for mobility) that includes other functionality such as the ability to move its head and/or arm portions is included within the meaning of surrogate as used herein.

As used herein a mobility base is a mechanized vehicle. The mobility base includes various structural components including a support for carrying the mannequin or robotic torso and a mechanized transport module that includes wheels etc. and drive mechanism with steering which provides for transport of the vehicle across the ground or other surface. As will be explained below, when user 314a interacts with first surrogate platform 312a in location 311a, the user 314a actually perceives seeing user 314b and hearing user 314b in location 311b. In addition, with the mobility base 323b associated with second surrogate platform 312b, the user 314a while interacting with first surrogate platform 312a in location 311a can control the second mobility base 323b associated with the second surrogate platform 312b by a first user interface control device 314a in location 311a. The first user interface control device 360a is configured to control the second mobility base 323b in location 311b. This allows the user 314a to actually perceive user 314b, hearing what user 314b in location 311b hears, based on surrogate 312b's physical travel about location 311b. Travel (that is mobility) of surrogate 312b is controlled by the user 314a controlling the mobility base 323b via the user interface device 360a.

Likewise, when user 314b interacts with second surrogate platform 312b in location 311b, the user 314b actually perceives seeing user 314a and hearing user 314a in location 311a. In addition, with the mobility base 323a associated with first surrogate platform 312a, the user 314b can control the first mobility base 323a associated with the first surrogate platform 312a by a second user interface control device 360b in location 311b. The second user interface control device 360b is configured to control the first mobility base 323a in location 311a. This allows the user 314b to actually perceive user 314a, hearing what user 314a in location 311a hears, based on surrogate 312a's physical travel about location 311a. Travel (that is mobility) of surrogate 312a is controlled by the user 314b controlling the mobility base 323a via the user interface device 360b.

Details of the gateways 316a and 316b are discussed below. Suffice it to say that the gateways 316a and 316b execute processes to process and transport raw data produced from devices for instance when users 314a and 314b interact through respective MSU's 312b and 312a, by use of the remote controls 360a, 360b respectively being paired with the mobility bases 323b, 323a, respectively. Suffice it also here to say that cameras and microphones carried on MSU's provide images and audio that are sent to user goggles, which allow a user to see and hear what a corresponding surrogate sees and hears. The mobility bases 323a, 323b are controlled by the remote controls 360b, 360a, respectively, which are in physical locations that are different from the physical locations of the mobility bases 323a, 323b allowing users in the locations of the remote controls to control movements of the mobility bases and hence the travel of the humanoid forms providing surrogate mobility in a very cost effective manner.

In the discussion below, a user is considered "paired" with a surrogate when the user and paired surrogate are in different locations (i.e., the surrogate in one location acts as a "stand in" at that location in place of the user in the different location) and the user is considered "associated" with a surrogate when that user and surrogate are physically in the same location and the user interacts with that surrogate in that same physical location. Thus in FIG. 13, user 314a and second surrogate platform 312b are "paired" as are user 314b and first surrogate platform 312a, whereas user 314a is "associated" with first surrogate platform 312a and user 314b is "associated" with second surrogate platform 312b. During a session, a pairing is fixed whereas an association can vary.

Similarly user interface is considered "paired" with a mobility base of a surrogate platform when the user interface and the paired mobility base of a surrogate platform are in different locations (i.e., the mobility base of the surrogate platform in one location is controlled by the user interface in the different location, with the user interface effectively allowing the surrogate to move at that location in place of the user, as the user would move).

Thus in FIG. 13, user interface 360a and second surrogate platform 312b are "paired" as are user interface 360b and first surrogate platform 312a, whereas user 314a is "associated" with first surrogate platform 312a and user 314b is "associated" with second surrogate platform 312b. Also, in FIG. 13, user interface 360a is carried by user 314a and is paired with the second mobility base 323b of the second surrogate platform 312b and the user interface 360b carried by user 314b is paired with the first mobility base 323a of the first surrogate platform 312a.

Also shown in FIG. 13, are two additional sets of entities, one set in location 311a and the other set in location 311b. (In a practical application there can be many additional sets of entities in each of the locations, but for clarity only two additional sets are discussed herein.) Also, in a practical application there can be more than two locations, but for clarity only two locations are discussed below. In location 311a there is an additional user 315a with user interface 361a and an additional surrogate platform 313a (e.g., a MSU) with a mobility base 325a. In location 311b there is an additional user 315b with user interface 361b and an additional surrogate platform 313b (e.g., a MSU) with mobility base 325b. For this discussion, consider first only the additional entities (user 315b and surrogate platform 313b) in location 311b.

Therefore, in at least one location there is a surrogate base that is supported by a mobility base and in at least one, different location there is a user interface control device that is configured to allow a user to control the mobility base.

With respect to user 314a at location 311a, user 314a will see user 314b as above through second surrogate platform 312b, but at times user 314a will also see surrogate platform 313b through second surrogate platform 312b. It is desired that rather than seeing surrogate platform 313b, that user 314a see instead user 315a who is paired with surrogate platform 313b. That is, user 314a sees surrogate platform 313b because user 314a sees and hears what the second surrogate platform 312b sees and hears, and thus when second surrogate platform 312b has surrogate platform 313b in its field of view, user 314a perceives seeing surrogate platform 313b, and (if user 315b is also in the field of view also sees user 315b) at location 311b. In this instance, second surrogate platform 312b sees surrogate platform 313b, but not user 315a.

To address this problem, the virtual encounter system 310 includes aliasing-substitution processing. In one implementation there is one aliasing-substitution processing module for the two set of locations. In another implementation, there is an aliasing-substitution processing module at each gateway. In this latter implementation, each gateway system 316a, 316b includes an aliasing-substitution processing module 317a, 317b, respectively.

A complete description of aliasing-substitution processing is disclosed in the above-mentioned Issued U.S. Pat. No. 10,223,821, the entire contents of which are incorporated herein by reference. As needed, the general concept of aliasing-substitution processing will be discussed below. In addition, aspects of aliasing-substitution processing specifically pertaining to the subject matter of the present application will be presented.

Aliasing-substitution processing modules 317a, 317b, process images received from MSU's in respective locations and perform real time image transformation, so that rather than seeing a surrogate of another user at a remote location, the user sees the user that the surrogate represents. Essentially, the aliasing-substitution processing works in a similar manner whether there is one or multiple aliasing-substitution processing modules.

In other words, in the context of FIG. 13, the aliasing-substitution processing 317b receives images from the second surrogate platform 312b and transforms portions of some of the images received from the second surrogate platform 312b, in real time, by replacing those portions of the received images that have the surrogate platform 313b in the images with images of the user 315a that the surrogate platform 313b represents. That is, the aliasing-substitution processing 317b replaces the surrogate platform 313b images with images of the paired user 315a in location 311a. This replacement could be a static replacement, meaning that the same image could be used in all replacements, ignoring any movements of the associated human user. or the replacement could be dynamic replacement, meaning that the replacement of the image would include images corresponding to movement of the associated human user.

In either case, images of the surrounding scene (and in particular in regions of intersection between a background and the image of the user) may need to be repaired so that the images do not look jagged or unusual. A pixel-based aliasing processing can be used for repair to these intersections to remove jagged edges and blend in the image with the background. The images that are rendered by the goggles worn by user 314a while seeing through second surrogate platform 312b in location 311b would render not the surrogate platform 313b but the user 315a. Techniques to accomplish this are described below.

With respect to user 314b, user 314b will see user 314a at location 311a through first surrogate platform 312a in location 311a and user 314b will also see surrogate platform 313a rather than user 315b. Again, this problem can be addressed by the virtual encounter system 310 performing aliasing-substitution processing with aliasing-substitution processing module 317a to perform a real time image transformation, so that rather than the user 314b seeing the surrogate platform 313a of the user 315b at remote location 311b, the user 314b sees the user 315b that is paired with the surrogate platform 313a.

In the implementation of a single aliasing-substitution processing module (not shown) that module would perform the functions that are performed by aliasing-substitution processing module 317a and aliasing-substitution processing module 317b.

As with the aliasing-substitution processing 317b, aliasing-substitution processing 317a receives images from the first surrogate platform 312a and transforms the images received from the first surrogate platform 312a in real time with either a static or dynamic replacement, meaning that the same image could be used in all replacement or replacement could be dynamic, meaning that the replacement would capture movement of the associated human user. In either case, again the surrounding scene may need to be repaired so that the images do not look jagged or unusual. Thus, the images that are rendered by the goggles worn by user 314b while seeing through first surrogate platform 312a in location 311a would render not the surrogate platform 313a but the user 315b.

Figures 14A, 14B:
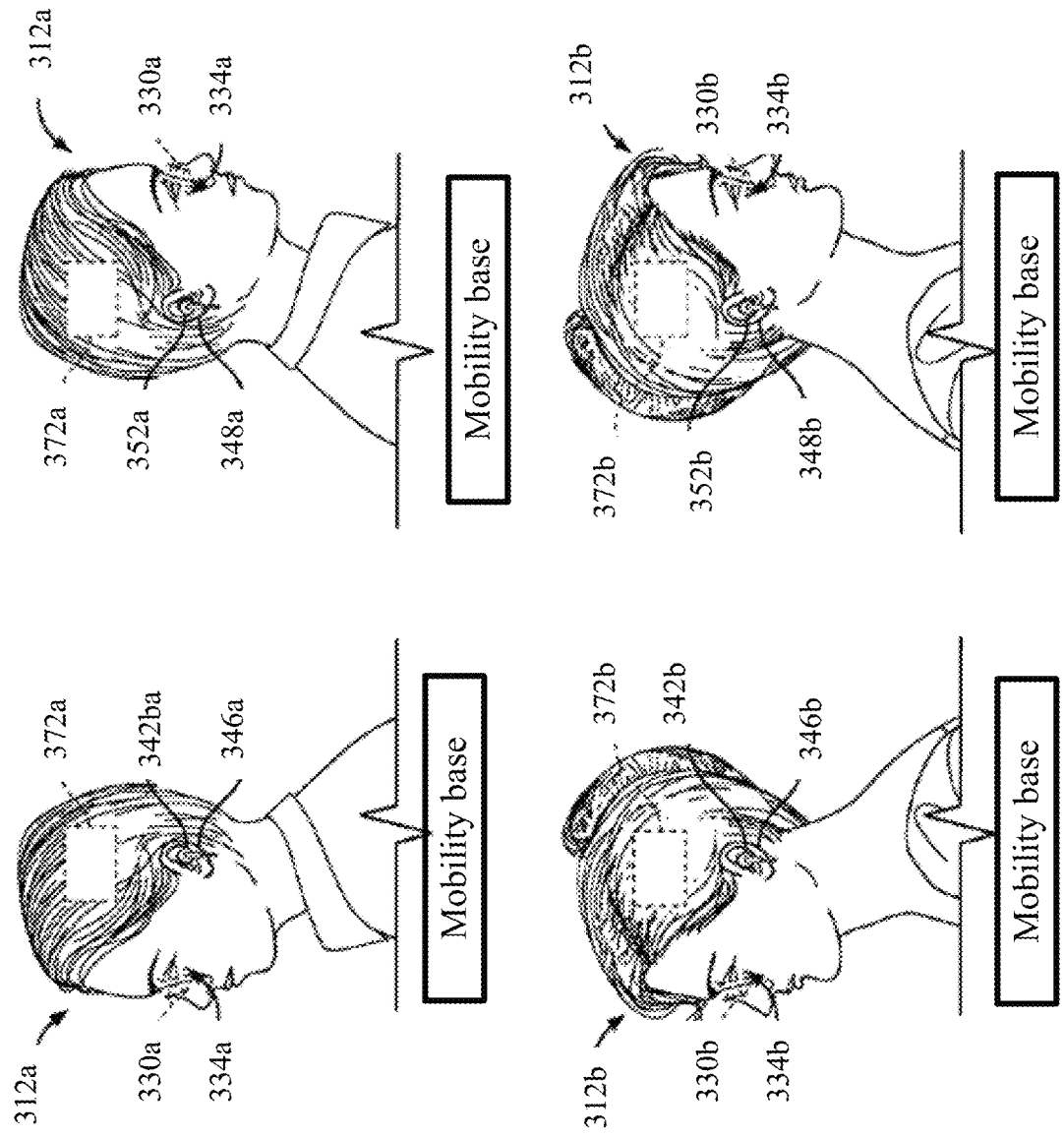
FIG. 14A is a view of a left side of a mobility surrogate unit head.
FIG. 14B is a view of a right side of a mobility surrogate unit head.

Referring to FIGS. 14A and 14B, each surrogate platform 312a-312b (alternative more human like MSU depicted, although MSU 20 could be used) includes a camera (e.g., camera 330a and camera 330b) positioned in left eye sockets 334a and 334b, respectively and a camera (e.g., camera 336a and camera 336b) positioned in right eye sockets 338a and 338b, respectively. Each surrogate platform 312a-312b also includes at least one microphone (e.g., microphone 342a and microphone 342b) positioned within left ears 346a and 346b), respectively and a microphone (e.g., microphone 348a and microphone 348b) positioned within right ears 352a and 352b, respectively. Each surrogate platform 312a-312b further includes a transmitter (e.g., transmitter 372a and transmitter 372b) containing a battery (not shown). Transmitters 372a-372b send the audio and video signals from the cameras and the microphones to communication gateway 316a-316b.

Figure 14C:
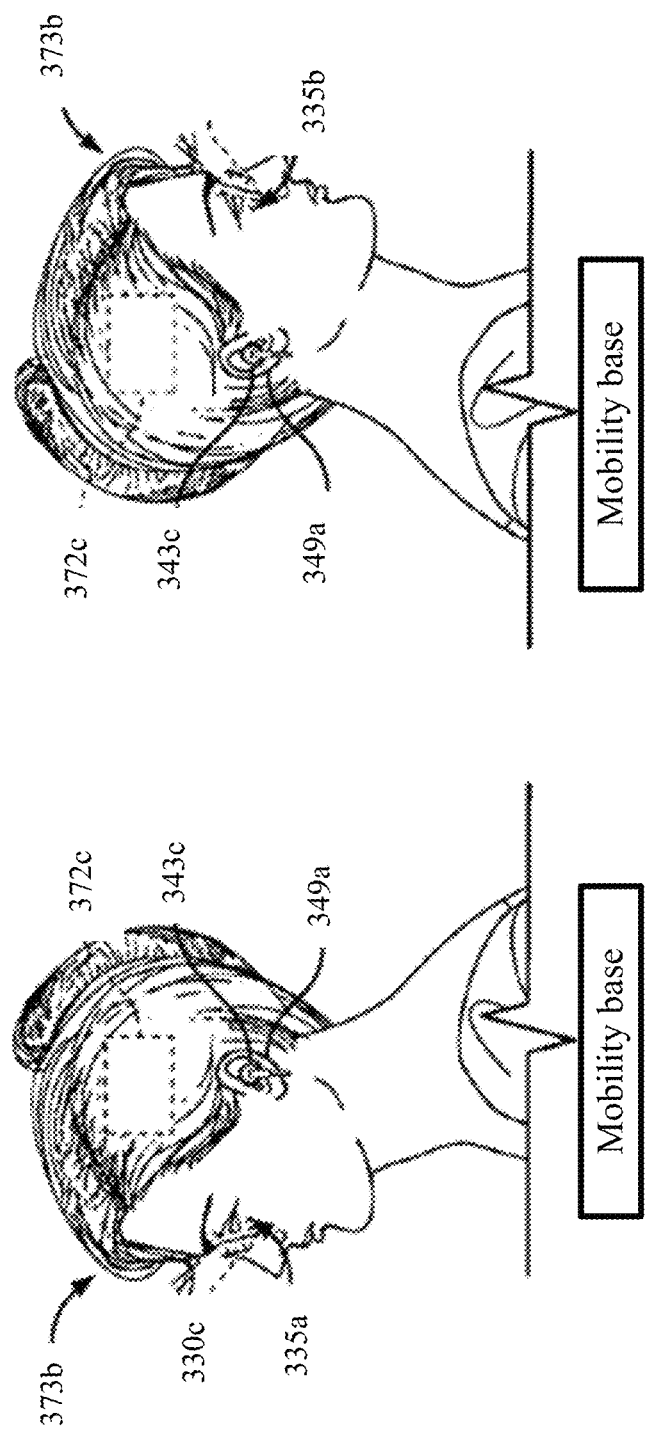
FIG. 14C is a view of left and right sides of a third mobility surrogate unit head.

Referring to FIG. 14C, surrogate platform 313b (alternative more human like MSU depicted, although MSU 20 could be used) includes cameras 335a, 335b, positioned in respectively left and right eye sockets (not referenced), microphones 349a, 349b positioned respectively within left/right ears (343a, 343b), as discussed above, as well as a transmitter 372c (similar to second surrogate platform 312b).

While goggles are described in the above Issued U.S. Pat. No. 10,223,821 and include a left display and a right display, and left and right receivers, a headset could alternatively be used. Receivers receive audio and video signals transmitted from a paired surrogate where sounds are rendered by earphones.

Figure 15:
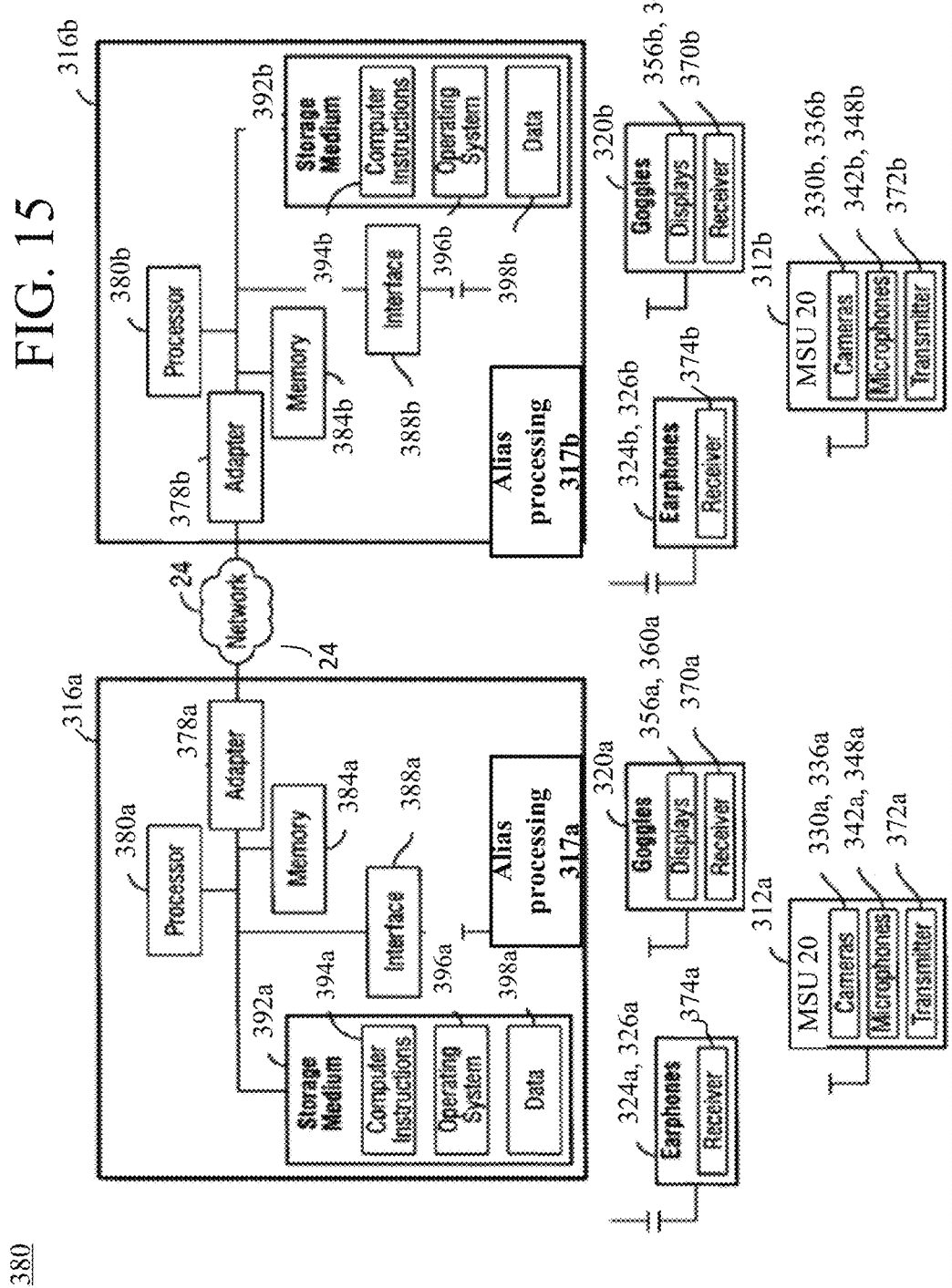
FIG. 15 is a functional block diagram showing processing components including a user interface control that is associated with a physically remote mobility base.

Referring to FIG. 15, each communication gateway 316a-316b includes an adapter 378a-378b, a processor 380a-380b, memory 384a-384b, an interface 388a-388b and a storage medium 392a-392b (e.g., a hard disk, flash memory, etc.). Each adapter 378a-378b establishes a bi-directional signal connection with network 24. Each interface 388a-388b receives, via transmitter 372a-378b in surrogate platforms 312a-312b, video signals from cameras 330a-330b, 336a-336b and audio signals from microphones 342a-342b, 348a-348b. Each interface 388a-388b sends video signals to displays 356a, 356b and 360a, 360b in goggles 320a-320b via receivers 370a, 370b. Each interface 388a-388b sends audio signals to earphones 324a-324b, 326a-326b in goggles 320a-320b via receivers 374a-374b. Each storage medium 392a-392b stores an operating system 396a-396b, data 398a-398b for establishing communications links with other communication gateways, and computer instructions 394a-394b which are executed by processor 380a-380b in respective memories 384a-384b to coordinate, send and receive audio, visual and other sensory signals to and from network 24. Signals within system 310 of FIG. 13 are sent using a standard streaming connection using time-stamped packets or a stream of bits over a continuous connection.

Each of the MSU's of FIG. 13 interacts with their corresponding users via the Universal Surrogate Platform (USP) via individual SUIL's to MSU's. One potential application of the system in FIG. 13 is as part of virtual encounter in which a user operates in the virtual world more fully through a mobility surrogate a training scenario for MSU's in a virtual world as opposed to the real-world training discussed above.

Using system 310, two users (or four users) can have conversations where each of the users perceives that the other is in the same location as them through the paired MSU's 314a, 314b, and/or 315a, 315b. In operation, camera 330b and camera 336b record video images from location 311b. The video images are transmitted wirelessly to communication gateway 316b as video signals. Communication gateway 316b sends the video signals through network 24 to communication gateway 316a. Communication gateway 316a transmits the video signals wirelessly to set of goggles 320a. The video images recorded by camera 330b are rendered on to display 356a, and the video images recorded on camera 336b are rendered on to display 360a.

Likewise, communication gateway 316a and communication gateway 316b work in the opposite direction through network 24, so that the video images, from location A, recorded by camera 330a are rendered on to display 356b. The video images recorded by camera 336a are rendered on display 360b.

The sounds received by microphone 342a in location A, are transmitted to earphone 324b and sounds received in location 311a by microphone 348a are transmitted to earphone 326b. The sounds received by microphone 342b in location 311b are transmitted to earphone 324a and sounds received in location 311b by microphone 348b are transmitted to earphone 326a.

Similar considerations apply for additional channels with respect to users 315a, 315b and MSU's 313a and 313b.

Using system 310, two users or four users can also control movements of their corresponding MSU's 314a, 314b, and/or 315a, 315b that are in different physical locations from the locations of and paired with the corresponding user interfaces 312a, 312b, 361a, 361b. Thus, each of the users in addition to perceiving that the other is in the same location as that user through the user's corresponding paired mobility surrogate, that user also perceives the user in the different location and the different location surroundings as the mobility surrogate moves about the different physical respective location under control of the user having the user interface device.

For example, referring back to FIG. 13, assuming two users 312a, 312b (four users would be similar) are having a conversation. User 312a perceives the other user 312b as being in the same physical location as user 312a through user's 312a paired mobility surrogate 314b. With user interface control, 360a, user 312a controls the movement of paired mobility surrogate 314b. Similarly, user 312b perceives user 312a as being in the same physical location as user 312b through user's 312b paired mobility surrogate 314a. With user interface control, 360b, user 312b controls the movement of paired mobility surrogate 314a. Thus, each of the users 312a, 312b in addition to perceiving that the other is in the same location (perceiving being hearing and seeing what the mobility surrogate hears and sees) also has perceptions that change along with changes in surrogate movements/positions.

As shown and explained in more detail in published patent application US 2005-0130108 A1 published Jun. 16, 2005 that is incorporated herein by reference in its entirety other features can be included, and may be modified according to the use of the mobility platforms. For example, backgrounds captured by MSU's can be altered such that users perceive different backgrounds, user images can be morphed, etc.

For example, user 314a can receive an image of user 314b, but the actual background behind user 314b is altered. For example, user 314b is in a room but user 314a perceives user 314b on a beach or on a mountaintop (not shown).

In other embodiments, a user 314a can receive a morphed image of user 314b. For example, an image of user 314b is transmitted through network 24 to communications gateway 316a.

Aliasing-substitution processing as disclosed in the Issued U.S. Pat. No. 10,223,821 can be modified to take into consideration movement of the mobility surrogate relative to the associated user in a given physical location. The aliasing-substitution processing receives information that specifies the physical locations of each of the MSU s. The information received from the MSU's can include positional information as well as speed, inclination, direction of travel, etc. This information can be processed to further assist aliasing-substitution processing in location of the mobility surrogate 313b. This information would be conveyed over a different channel than the channel used to convey control information.

On the other hand, this information could instead be derived from the command messages sent from the user interface. For example, a reference position of the mobility surrogate can be established at the start of a session and that reference is communicated to the alias processing. During the session, in the command messages sent from the user interface in addition to command information (e.g., commands that control the mobility base) can be data. The data contained in the messages can be for example information that specifies a distance and a direction of travel (or the distance of travel and direction can be inferred by for example by a physical and temporal extent of assertion of a user control, such as the extent of assertion of a joystick or pressing a control button, or a slider bar, etc.) This data, whether the data that is sent to the corresponding mobility base(s) or that is inferred, is provided to the alias processing as additional input in tracking mobility platforms in a location having multi-users and multi MSU s.

The processing modules can be programmed computing devices that are part of the gateway devices or can be separate computing devices such as computers and or server computer systems. Servers may be a single server or a group of servers that are at a same location or at different locations. These server systems can be dedicated systems, e.g., traditional servers and/or virtual servers running in a "cloud computing" environment and networked using appropriate networking technologies such as Internet connections. Applications running on those servers may communicate using XML/SOAP, RESTful web service, and/or other appropriate application layer technologies such as HTTP and ATOM.

Server systems receive information from client devices and/or user devices via interfaces. Specific implementation of interfaces can be any type of interface capable of receiving information over a network, such as an Ethernet interface, a wireless networking interface, a fiber-optic networking interface, and so forth. Servers also include a processor and memory, a bus system including, for example, a data bus and a motherboard, which can be used to establish and to control data communication between the components of server.

Processors may include one or more microprocessors. Generally, processor may include any appropriate processor and/or logic that is capable of receiving and storing data, and of communicating over a network (not shown). Memory can include a hard drive and a random-access memory storage device, such as a dynamic random access memory, machine-readable media, or other types of non-transitory machine-readable storage devices.

Components also include storage devices configured to store information including data and software. Embodiments can be implemented in digital electronic circuitry, or in computer hardware, firmware, software, or in combinations thereof. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks, etc. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A mobility surrogate comprising:
    a humanoid form supporting at least one camera that captures image data from a first physical location in which the first mobility surrogate is disposed to produce an image signal; and
    a mobility base that comprises:
    a support mechanism, with the humanoid form affixed to the support on the mobility base; and
    a transport module comprising:
    mechanical drive mechanism; and
    a transport control module comprising:
    a processor and memory that are configured to
    receive control messages from a network; and
    process the control messages to control the transport module according to the control messages received from the network; and the mobility surrogate further comprising
    an artificial intelligence system that includes a processor device, memory and storage that stores computer instructions to cause an artificial intelligence engine to train the mobility surrogate, with the artificial intelligence engine executing computer instructions to:
        observe actions of a human performing a given task in the real world;
        analyze observed actions of the human to produce sequences of actions for the given task; and
        package the analyzed actions into a sequence package that is stored in computer storage; and
    an alias-substitution processing module comprising:
        a processor configured to:
        receive an image signal;
        detect a second mobility surrogate in the image signal; and
        replace the image data of the second surrogate in the first physical location, with image data of a user in the first physical location to form a transformed image.

2. The mobility surrogate of claim 1 wherein the artificial intelligence engine operates with a database.

3. The mobility surrogate of claim 1 wherein the artificial intelligence engine evolves to perform the tasks using the mobility surrogate.

4. The mobility surrogate of claim 1 wherein the actions are analyzed and used to train the artificial intelligence engine in the real world, rather than via a training program.

5. The mobility surrogate of claim 1 wherein the artificial intelligence engine is a mechanism that assists the human's control of the task.

6. The mobility surrogate of claim 1 further comprises instructions to:
    train the artificial intelligence engine by observing the users actions.

7. The mobility surrogate of claim 1 wherein training comprises instructions to:
    define a self-organizing map space as a finite two dimensional region of nodes, where the nodes are arranged in a grid; and
    associate each node in the grid with a weight vector that is a position in the input space.

8. The mobility surrogate of claim 7 wherein training further comprises instructions to:
    apply a training example to the self-organizing map;
    randomize the node weight factors in the map;
    select a training vector randomly from training data input; and
    compute a given training vector's distance from each node in the map; and
    compare the node whose weight is closest to that of the training example as the best matching unit.

9. The mobility surrogate of claim 1 wherein the artificial intelligence engine is configured to: learn the task to reduce or eliminate latency or delay time or to increase efficiency or reliability of performing the task.

10. The mobility surrogate of claim 9 wherein the delays are bidirectional and can result from propagating of instructions through electronic equipment and communication, networks used to transmit the instructions and the processing time to execute instructions.

11. The mobility surrogate of claim 1 wherein the artificial intelligence engine is built using a self-organizing map or self-organizing feature map, which are types of artificial neural networks trained by unsupervised learning techniques to produce a low-dimensional discretized representation of an input space of training samples.

12. The mobility surrogate of claim 9, further comprises:
    a data center that is configured to accumulate and store skills sets for use with the artificial intelligence engine.

13. The mobility surrogate of claim 12 wherein the artificial intelligence engine downloads the skill sets from the data center.

14. The mobility surrogate of claim 9, further comprises:
    a platform that connects an operator to the mobility surrogate via a network; and
    a sensor user interface link.

* * * * *